United States Patent
Papasakellariou et al.

(10) Patent No.: US 9,954,667 B2
(45) Date of Patent: *Apr. 24, 2018

(54) CHANNEL STATE INFORMATION FOR ADAPTIVELY CONFIGURED TDD COMMUNICATION SYSTEMS

(71) Applicant: Samsung Electronics Co., Ltd, Suwon-si, Gyeonggi-do (KR)

(72) Inventors: Aris Papasakellariou, Houston, TX (US); Jianzhong Zhang, Plano, TX (US)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/069,944

(22) Filed: Mar. 14, 2016

(65) Prior Publication Data
US 2016/0197715 A1 Jul. 7, 2016

Related U.S. Application Data

(63) Continuation of application No. 14/201,087, filed on Mar. 7, 2014, now Pat. No. 9,306,725.

(60) Provisional application No. 61/780,182, filed on Mar. 13, 2013, provisional application No. 61/809,059, filed on Apr. 5, 2013, provisional application No. 61/933,720, filed on Jan. 30, 2014.

(51) Int. Cl.
*H04W 4/00* (2009.01)
*H04L 5/14* (2006.01)
*H04L 5/00* (2006.01)

(52) U.S. Cl.
CPC ............ *H04L 5/1469* (2013.01); *H04L 5/001* (2013.01); *H04L 5/0048* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 9,306,725 B2* | 4/2016 | Papasakellariou | .... H04L 5/1469 370/328 |
| 9,456,372 B2* | 9/2016 | Lee | ...................... H04L 25/0226 370/328 |

(Continued)

FOREIGN PATENT DOCUMENTS

WO 2013025558 A1 2/2013

OTHER PUBLICATIONS

"CSI-RS Patterns for Interference Measurements for CoMP," 3GPP TSG-RAN WG1 #68bis, Fujitsu, R1-121188, XP050599486, Jeju, Korea, Mar. 26-30, 2012, 9 pages.

(Continued)

*Primary Examiner* — Anh-Vu Ly

(57) ABSTRACT

For a base station or a User Equipment (UE) in communication with each other, the UE is configured by the base station for operation with an adapted Time Division Duplex (TDD) UpLink-DownLink (UL-DL) configuration. The base station configures a UE with resources for obtaining channel and interference measurements in two sets of Transmission Time Intervals (TTIs) and the UE obtains a Channel State Information (CSI) from the channel and interference measurements in the two sets of TTIs.

20 Claims, 10 Drawing Sheets

(56) References Cited

U.S. PATENT DOCUMENTS

| | | | | |
|---|---|---|---|---|
| 9,572,063 | B2* | 2/2017 | Etemad | H04W 24/02 |
| | | | | 370/328 |
| 2013/0258965 | A1* | 10/2013 | Geirhofer | H04W 72/048 |
| | | | | 370/329 |
| 2013/0322376 | A1* | 12/2013 | Marinier | H04W 72/06 |
| | | | | 370/329 |
| 2014/0092878 | A1* | 4/2014 | Davydov | H04W 52/0258 |
| | | | | 370/336 |
| 2014/0269451 | A1* | 9/2014 | Papasakellariou | H04B 7/2656 |
| | | | | 370/280 |

OTHER PUBLICATIONS

"Zero-Power CSI-RS Configurations for Interference Measurements in CoMP," 3GPP TSG-RAN WG1 #69, Fujitsu, R1-122078, XP050600367, Prague, Czech Republic, May 21-25, 2012, 4 pages.
Foreign Communication From a Related Counterpart Application, European Application No. 14159530.6-1875, Communication Pursuant to Article 94(3) EPC dated Feb. 24, 2017, 6 pages.
Chinese Office Action for Chinese Application No. 2014800152290, dated Jul. 13, 2017. (12 pages).

\* cited by examiner

CHANNEL STATE INFORMATION FOR ADAPTIVELY CONFIGURED TDD COMMUNICATION SYSTEMS

CROSS-REFERENCE TO RELATED APPLICATION AND CLAIM OF PRIORITY

This application is a continuation of U.S. Non-Provisional patent application Ser. No. 14/201,087 Filed Mar. 7, 2014 and entitled "CHANNEL STATE INFORMATION FOR ADAPTIVELY CONFIGURED TDD COMMUNICATION SYSTEMS," and claims priority through that application to U.S. Provisional Patent Application Ser. No. 61/780,182 filed Mar. 13, 2013 and entitled "Channel State Information for Adaptively Configured TDD Communication Systems," U.S. Provisional Patent Application Ser. No. 61/809,059 filed Apr. 5, 2013 and entitled "Channel State Information for Adaptively Configured TDD Communication Systems," and U.S. Provisional Patent Application Ser. No. 61/933,720 filed Jan. 30, 2014 and entitled "Channel State Information for Adaptively Configured TDD Communication Systems." The above-identified patent documents are incorporated herein by reference.

TECHNICAL FIELD

The present application relates generally to wireless communications and, more specifically, to providing channel state information for scheduling downlink and uplink transmissions in adaptively configured time division duplex (TDD) communication systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

This disclosure provides a system and method for performing uplink and downlink link adaptation in adaptively configured time division duplex (TDD) communication systems.

In a first embodiment, a method is provided. The method includes transmitting, by a base station to a User Equipment (UE), signaling indicating a first Time Division Duplexing (TDD) UpLink-DownLink (UL-DL) configuration. A TDD UL-DL configuration is defined over a time period of ten SubFrames (SFs) that comprise DL SFs where a communication direction is from the base station to the UE, UL SFs where a communication direction is from the UE to the base station, and special SFs where a communication direction can be both from the base station to the UE and from the UE to the base station. Each SF of the ten SFs has a unique time domain index. The method also includes transmitting, by the base station to the UE, a control channel configured to convey a DL Control Information (DCI) format indicating an adaptation of the first TDD UL-DL configuration to a second TDD UL-DL configuration, and configuration information for resources of a non-zero power Channel State Information Reference Signal (CSI-RS), resources of a first Channel State Information Interference Measurement (CSI-IM), and resources of a second CSI-IM wherein the non-zero power CSI-RS resources, the first CSI-IM resources and the second CSI-IM resources are respectively in a SF that is a DL SF, a DL SF, and an UL SF in the first TDD UL-DL configuration. In response to receiving, by the UE, signaling indicating the first TDD UL-DL configuration, the DCI format indicating the second TDD UL-DL configuration, the configuration information, the UE measures a first quantity based on signaling received in the non-zero power CSI-RS resources and on the first CSI-IM resources and a second quantity based on signaling received in the non-zero power CSI-RS resources and on the second CSI-IM resources when the UL SF is a DL SF in the second TDD UL-DL configuration.

In a second embodiment, a method is provided. The method includes transmitting, by a base station to a User Equipment (UE), signaling indicating a first Time Division Duplexing (TDD) UpLink-DownLink (UL-DL) configuration. A TDD UL-DL configuration is defined over a time period of ten SubFrames (SFs) that comprise DL SFs where a communication direction is from the base station to the UE, UL SFs where a communication direction is from the UE to the base station, and special SFs where a communication direction can be both from the base station to the UE and from the UE to the base station, and wherein each SF of the ten SFs has a unique time domain index. The method also includes transmitting, by the base station to the UE, a control channel conveying a DL Control Information (DCI) format indicating an adaptation of the first TDD UL-DL configuration to a second TDD UL-DL configuration. In response to receiving, by the UE, the signaling indicating the first TDD UL-DL configuration and the DCI format indicating the second TDD UL-DL configuration, the UE measures a first quantity in a first set of DL SFs of the second TDD UL-DL configuration to determine a first Channel State Information (CSI) and a second quantity in a second set of DL SFs of the second TDD UL-DL configuration to determine a second CSI. In addition, the UE discards a measurement of the second quantity in a DL SF from the second set of DL SFs from the determination of the second CSI if the measurement value is smaller than a second threshold value.

In a third embodiment, a base station is provided. The base station includes a transmitter configured to transmit, to a User Equipment (UE), signaling indicating a first Time Division Duplexing (TDD) UpLink-DownLink (UL-DL) configuration. A TDD UL-DL configuration is defined over a time period of ten SubFrames (SFs) that comprise DL SFs where a communication direction is from the base station to the UE, UL SFs where a communication direction is from the UE to the base station, and special SFs where a communication direction can be both from the base station to the UE and from the UE to the base station, and wherein each SF of the ten SFs has a unique time domain index. The base station also includes a transmitter configured to transmit, to the UE, a control channel configured to convey a DL Control Information (DCI) format indicating an adaptation of the first TDD UL-DL configuration to a second TDD UL-DL configuration. The transmitter further is configured to transmit configuration information for resources of a non-zero power Channel State Information Reference Signal (CSI-RS), resources of a first Channel State Information Interference Measurement (CSI-IM), and resources of a second CSI-IM wherein the non-zero power CSI-RS resources. The first CSI-IM resources and the second CSI-IM resources are respectively in a SF that is a DL SF, a DL SF, and an UL SF in the first TDD UL-DL configuration.

In a fourth embodiment, a User Equipment (UE) is provided. The UE includes a receiver configured to receive, from a base station, signaling indicating a first Time Division Duplexing (TDD) UpLink-DownLink (UL-DL) configuration. A TDD UL-DL configuration is defined over a time period of ten SubFrames (SFs) that comprise DL SFs where a communication direction is from a base station to the UE, UL SFs where a communication direction is from the UE to the base station, and special SFs where a communication direction can be both from the base station to the UE and from the UE to the base station. Each SF of the ten SFs has a unique time domain index. The UE also includes a receiver configured to receive, from a base station, a control channel transmitted from the base station and conveying a DL Control Information (DCI) format indicating an adaptation of the first TDD UL-DL configuration to a second TDD UL-DL configuration. The UE further includes a measurement unit configured to measure a first quantity in a first set of DL SFs of the second TDD UL-DL configuration to determine a first Channel State Information (CSI) and a second quantity in a second set of DL SFs of the second TDD UL-DL configuration to determine a second CSI, wherein the measurement unit discards a measurement of the second quantity in a DL SF from the second set of DL SFs from the determination of the second CSI if the measurement value is smaller than a second threshold value.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware with one or more of software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v11.1.0, "E-UTRA, Physical channels and modulation" (REF 1); 3GPP TS 36.212 v11.1.0, "E-UTRA, Multiplexing and Channel coding" (REF 2); 3 GPP TS 36.213 v11.1.0, "E-UTRA, Physical Layer Procedures" (REF 3); and 3GPP TS 36.331 v11.1.0, "E-UTRA, Radio Resource Control (RRC) Protocol Specification." (REF 4).

This disclosure relates to the adaptation of communication direction in wireless communication networks that utilize Time Division Duplex (TDD). A wireless communication network includes a DownLink (DL) that conveys signals from transmission points (such as base stations or eNodeBs) to user equipments (UEs). The wireless communication network also includes an UpLink (UL) that conveys signals from UEs to reception points such as eNodeBs.

Figure 1:
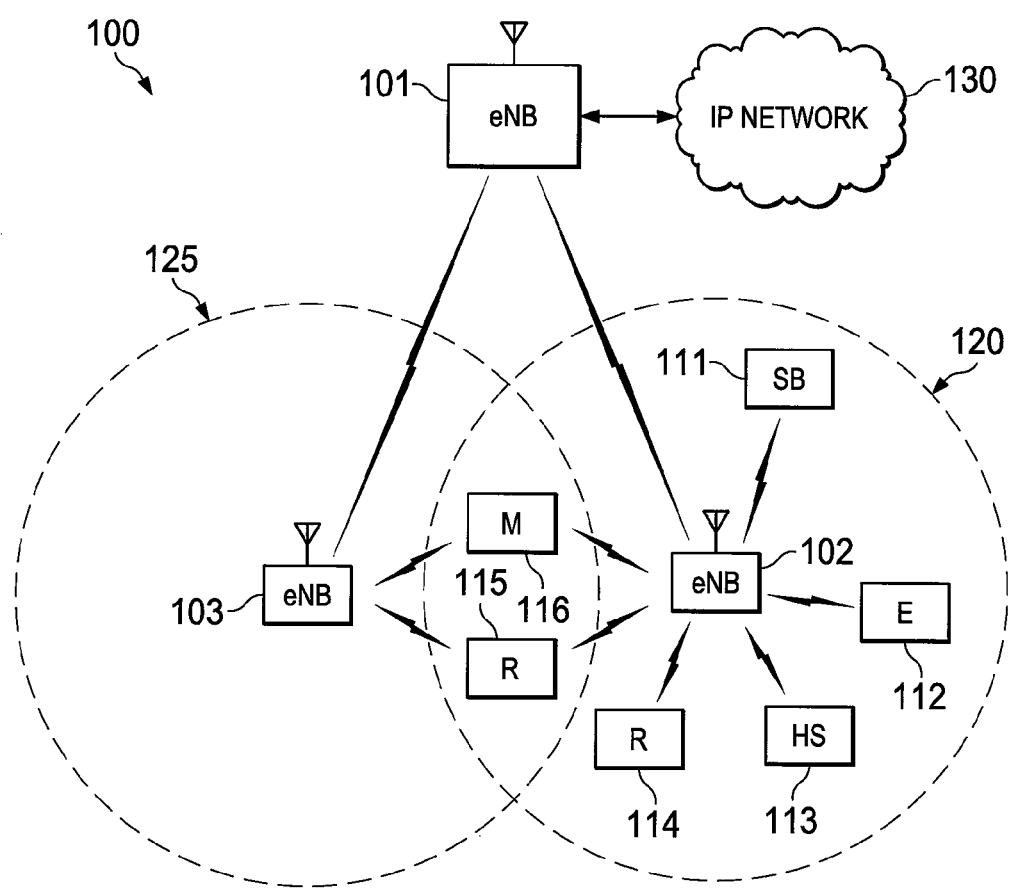
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, which can utilize TDD.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
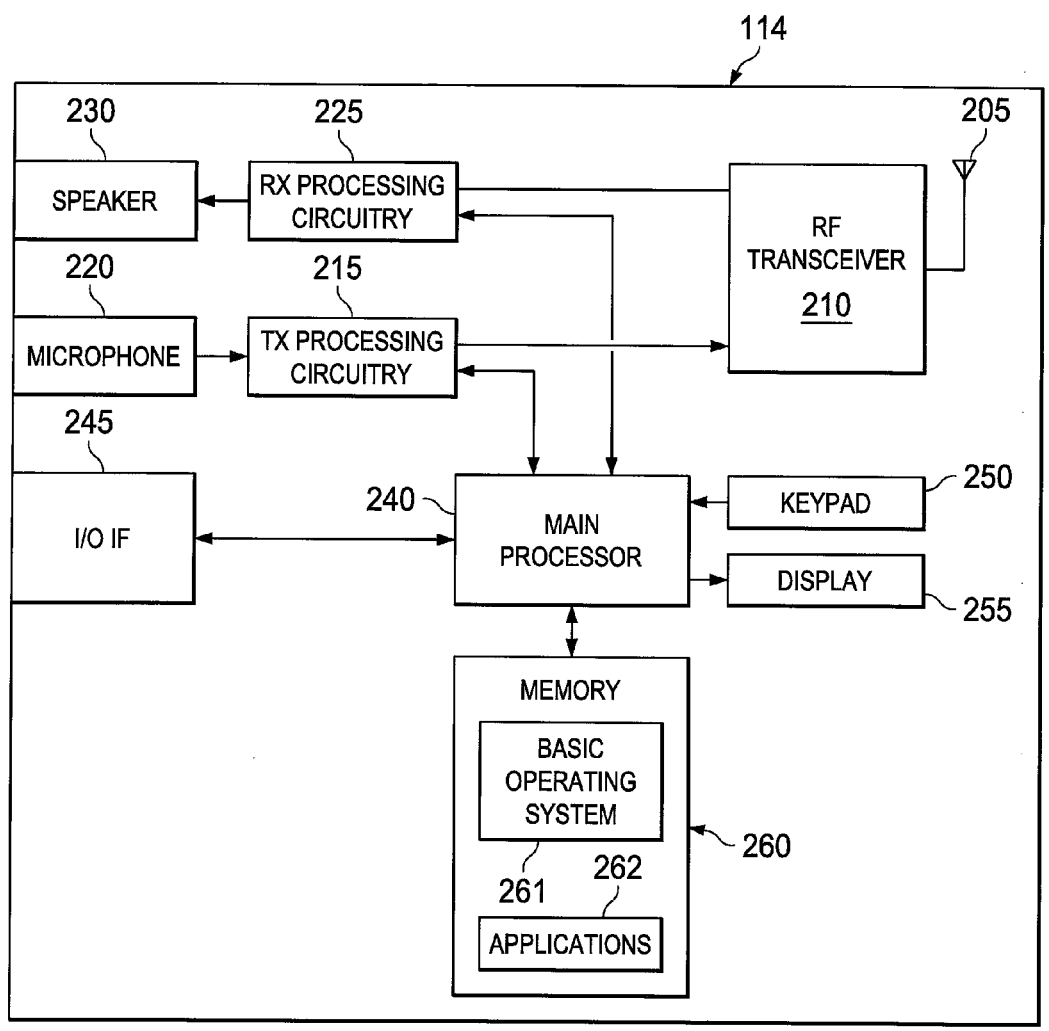
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230

(such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260 such as operations in support of providing channel state information for scheduling downlink and uplink transmissions in adaptively configured time division duplex (TDD) communication systems. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touchscreen.

The memory 260 is coupled to the main processor 240. Part of the memory 260 could include a random access memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support downlink signaling for uplink and downlink adaptation in adaptively configured TDD systems.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smartphone, UEs could be configured to operate as other types of mobile or stationary devices. In addition, various components in FIG. 2 could be replicated, such as when different RF components are used to communicate with the eNBs 101-103 and with other UEs.

Figure 3:
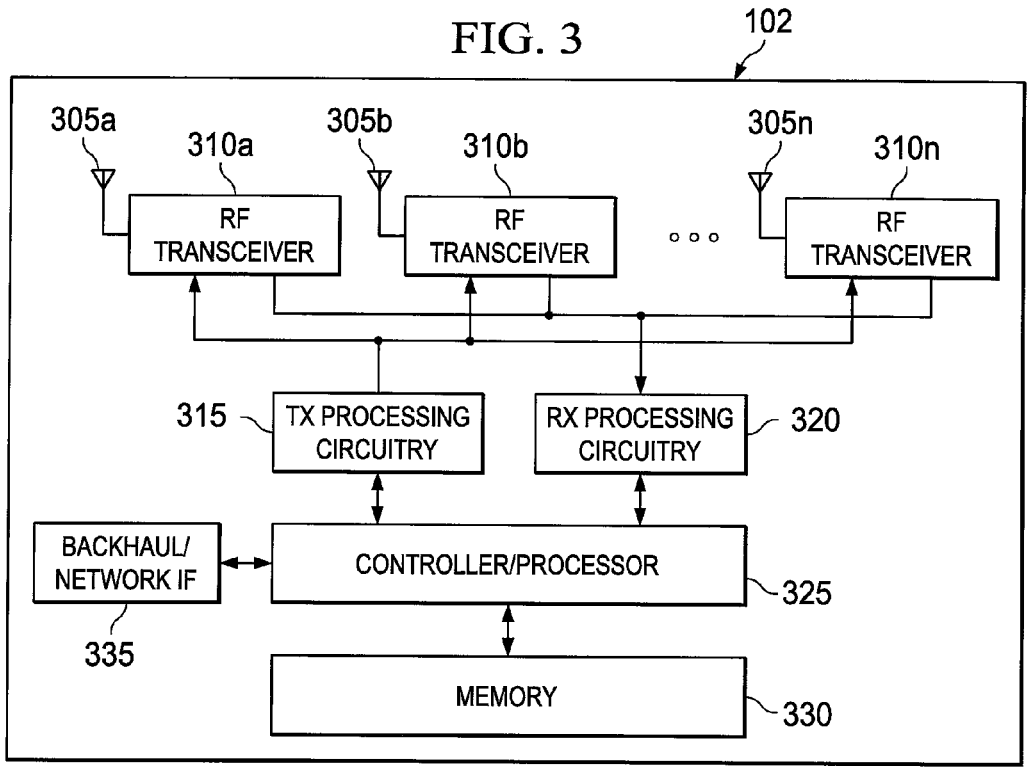
FIG. 3 illustrates an example eNodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support downlink signaling for uplink and downlink adaptation in adaptively configured TDD systems.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS), which are also known as pilot signals. An eNB can transmit data information or DCI through respective Physical DL Shared CHannels (PDSCHs) or Physical DL Control CHannels (PDCCHs). Enhanced PDCCHs (EPDCCHs) can also be used but for brevity further reference to EPDCCHs is omitted.

An eNB, such as eNB 102, can transmit one or more of multiple types of RS, including a UE-Common RS (CRS), a Channel State Information RS (CSI-RS), and a DeModulation RS (DMRS). A CRS can be transmitted over a DL system BandWidth (BW) and can be used by UEs, such as UE 114, to demodulate data or control signals or to perform measurements. To reduce CRS overhead, eNB 102 can transmit a CSI-RS with a smaller density in the time or frequency domain than a CRS. For channel measurement, Non-Zero Power CSI-RS (NZP CSI-RS) resources can be used. For interference measurement, UE 114 can use CSI Interference Measurement (CSI-IM) resources associated with a Zero Power CSI-RS (ZP CSI-RS) that is configured to UE 114 by a serving eNB 102 using higher layer signaling. A NZP CSI-RS configuration can include a number of CSI-RS antenna ports, a resource configuration, a time configuration, and so on (see also REF 3). A CSI-IM resource configuration can include a ZP CSI-RS configuration (pattern) and a ZP CSI-RS subframe configuration (see also REF 1 and REF 3). UE 114 is not expected to receive CSI-IM resource configurations that are not all completely overlapping with one ZP CSI-RS resource configuration. A CSI process consists of one NZP CSI-RS and one CSI-IM. UE 114 can use either a CRS or a CSI-RS to perform measurements and a selection can be based on a Transmission Mode (TM) that UE 114 is configured for PDSCH reception (see also REF 3). Finally, DMRS is transmitted only in the BW of a respective PDSCH or PDCCH, and UE 114 can use the DMRS to demodulate information in a PDSCH or PDCCH.

In some wireless networks, UL signals can include data signals conveying information content, control signals conveying UL Control Information (UCI), and RS. UE 114 can transmit data information or UCI through a respective Physical UL Shared CHannel (PUSCH) or a Physical UL Control CHannel (PUCCH). If UE 114 simultaneously transmits data information and UCI, UE 114 can multiplex both in a PUSCH. The UCI can include Hybrid Automatic Repeat reQuest ACKnowledgement (HARQ-ACK) information indicating correct or incorrect detection of data Transport Blocks (TBs) in a PDSCH, Service Request (SR) information indicating whether UE 116 has data in its buffer, and Channel State Information (CSI) enabling eNB 102 to select appropriate parameters for PDSCH transmissions to UE 114. HARQ-ACK information can include a positive ACKnowledgement (ACK) in response to a correct PDCCH or data TB detection, a Negative ACKnowledgement (NACK) in response to an incorrect data TB detection, and an absence of a PDCCH detection (DTX) that can be implicit or explicit. A DTX could be implicit if UE 114 does not transmit a HARQ-ACK signal. A DTX can be explicit if UE 114 can identify missed PDCCHs in other ways (it is also possible to represent NACK and DTX with the same NACK/DTX state).

The CSI can include a Channel Quality Indicator (CQI) informing eNB 102 of Transport Block Size (TBS) that can be received by the UE with a predefined target BLock Error Rate (BLER), a Precoding Matrix Indicator (PMI) informing eNB 102 how to combine signals from multiple transmitted antennas in accordance with a Multiple Input Multiple Output (MIMO) transmission principle, and a Rank Indicator (RI) indicating a transmission rank for a PDSCH. For example, UE 114 can determine a CQI from a Signal-to-Noise and Interference (SINR) measurement while also considering a configured PDSCH TM and the UE's receiver characteristics. Therefore, a CQI report from UE 114 can provide a serving eNB 102 an estimate of the SINR conditions experienced by DL signal transmissions to UE 114.

CSI transmission from UE 114 can be periodic (P-CSI) or aperiodic (A-CSI) as triggered by a CSI request field included in a DCI format conveyed by a PDCCH scheduling PUSCH. The UL RS can include DMRS and Sounding RS (SRS). DMRS can be transmitted only in a BW of a respective PUSCH or PUCCH, and eNB 102 can use a DMRS to demodulate information in a PUSCH or PUCCH. SRS can be transmitted by UE 114 in order to provide eNB 102 with a UL CSI. SRS transmission from UE 114 can be periodic (P-SRS or type 0 SRS) at predetermined Transmission Time Intervals (TTIs) with transmission parameters configured to UE 114 by higher-layer signaling, such as Radio Resource Control (RRC) signaling (see also REF 4). SRS transmission from UE 114 can also be aperiodic (A-SRS, or type 1 SRS) as triggered by a SRS request field included in a DCI format conveyed by a PDCCH scheduling PUSCH or PDSCH and indicating A-SRS transmission parameters from a set of A-SRS transmission parameters that were previously configured to UE 114 by a serving eNB 102 (see also REF 2 and REF 3).

When UE 114 is configured simultaneous transmission of P-CSI and A-CSI or of P-SRS and A-SRS for a same cell, it prioritizes a transmission for the A-CSI and the A-SRS, respectively, and suspends a transmission for the P-CSI and the P-SRS. In case UE 114 is configured with multiple CSI processes and needs to simultaneously transmit more than one P-CSI corresponding to different CSI processes, it prioritizes the P-CSI transmission associated with the smaller CSI process index and suspends other P-CSI transmissions. In case UE 114 is configured to report multiple P-CSI corresponding to respective multiple DL cells or configured to transmit multiple P-SRS corresponding to respective multiple DL cells and needs to simultaneously transmit more than one P-CSI or more than one P-SRS, respectively, it prioritizes the P-CSI transmission associated with the smaller DL cell index or the P-SRS transmission associated with the smaller UL cell index and suspends other P-CSI transmissions or P-SRS transmissions, respectively (see also REF 3).

Figure 4:
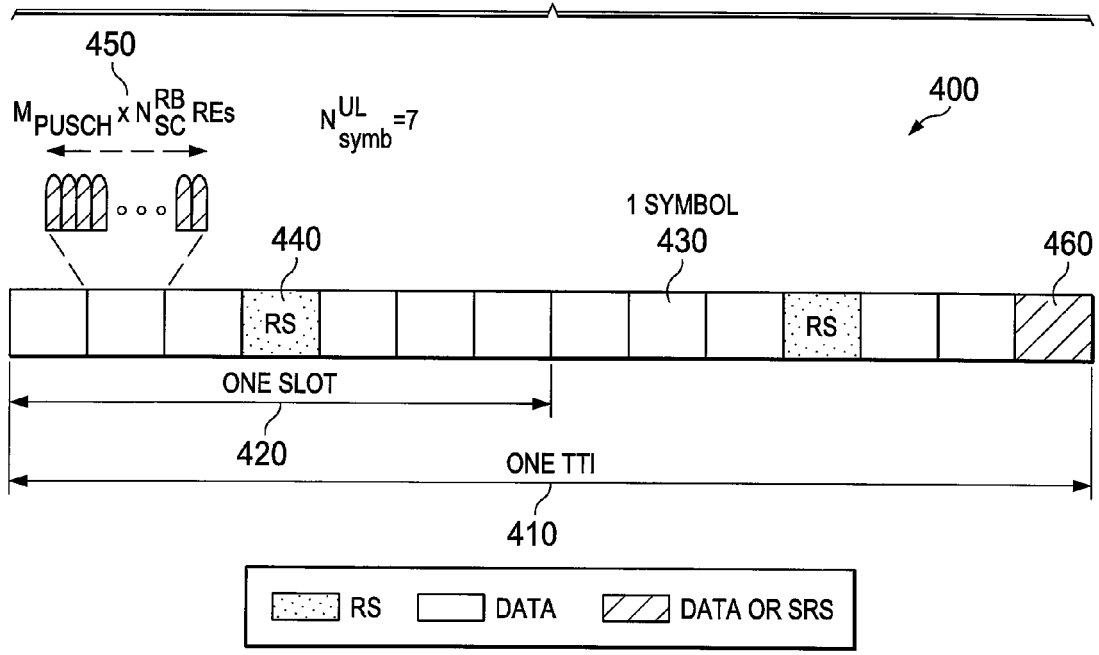
FIG. 4 illustrates an example conventional PUSCH transmission structure over a Transmission Time Interval (TTI) according to this disclosure.

FIG. 4 illustrates an example PUSCH transmission structure over a TTI according to this disclosure. The embodiment of the PUSCH transmission structure 400 over a TTI shown in FIG. 4 is for illustration only. Other embodiments could be used without departing from the scope of the present disclosure.

As shown in FIG. 4, a TTI is one subframe 410 that includes two slots. Each slot 420 includes $N_{symb}^{UL}$ symbols 430 for transmitting data information, UCI, or RS. Some PUSCH symbols in each slot are used for transmitting DMRS 440. A transmission BW includes frequency resource units that are referred to as Resource Blocks (RBs). Each RB includes $N_{sc}^{RB}$ sub-carriers, or Resource Elements (REs), and UE 114 is allocated $M_{PUSCH}$ RBs 450 for a total of $M_{sc}^{PUSCH}=M_{PUSCH} \cdot N_{sc}^{RB}$ REs for a PUSCH transmission BW. The last TTI symbol may be used to multiplex SRS transmissions 460 from one or more UEs. A number of TTI symbols available for data/UCI/DMRS transmission is $N_{symb}^{PUSCH}=2 \cdot (N_{symb}^{UL}-1)-N_{SRS}$, where $N_{SRS}=1$ if a last TTI symbol is used to transmit SRS and $N_{SRS}=0$ otherwise.

Figure 5:
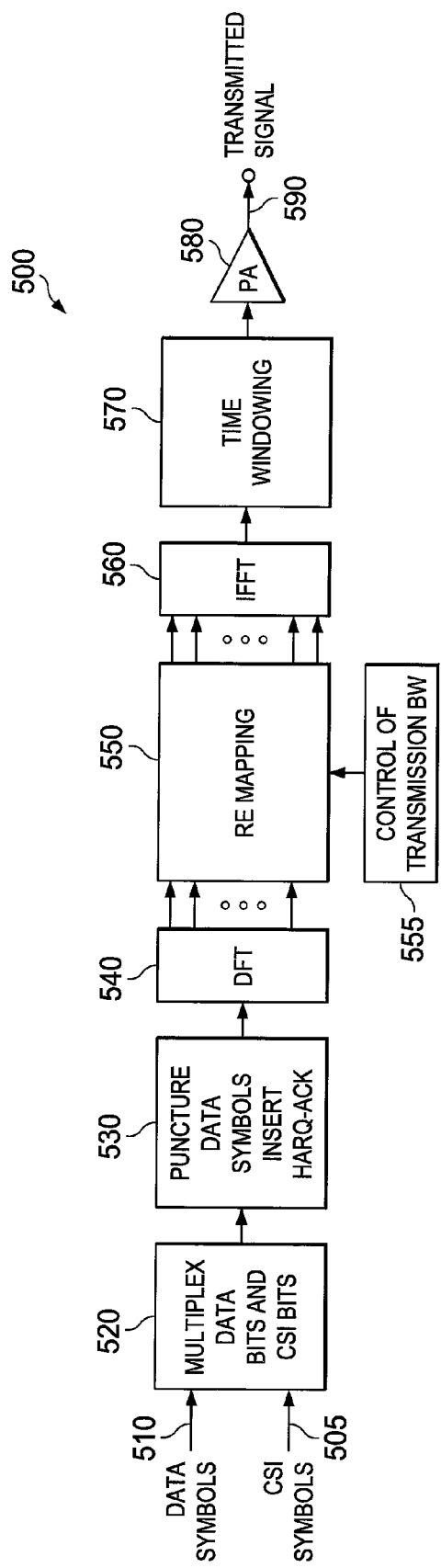
FIG. 5 illustrates an example transmitter block diagram for data information and UCI in a PUSCH according to this disclosure.

FIG. 5 illustrates an example transmitter block diagram for data information and UCI in a PUSCH according to this disclosure. The embodiment of the transmitter 500 shown in FIG. 5 is for illustration only. Other embodiments could be used without departing from the scope of the present disclosure. In certain embodiments, transmitter 500 is located within eNB 102. In certain embodiments, transmitter 500 is located within UE 114.

As shown in FIG. 5, coded CSI symbols 505 and coded data symbols 510 are multiplexed by multiplexer 520. Coded HARQ-ACK symbols are then inserted by multiplexer 530 by puncturing data symbols and/or CSI symbols. A transmission of coded RI symbols is similar to one for coded HARQ-ACK symbols (not shown). The Discrete Fourier Transform (DFT) is obtained by DFT unit 540, REs 550 corresponding to a PUSCH transmission BW are selected by selector 555, an Inverse Fast Fourier Transform (IFFT) is performed by IFFT unit 560, an output is filtered and by filter 570 and applied a certain power by Power Amplifier (PA) 580 and a signal is then transmitted 590. Additional transmitter circuitry such as digital-to-analog converter, filters, amplifiers, and transmitter antennas as well as encoders and modulators for data symbols and UCI symbols are omitted for brevity.

Figure 6:
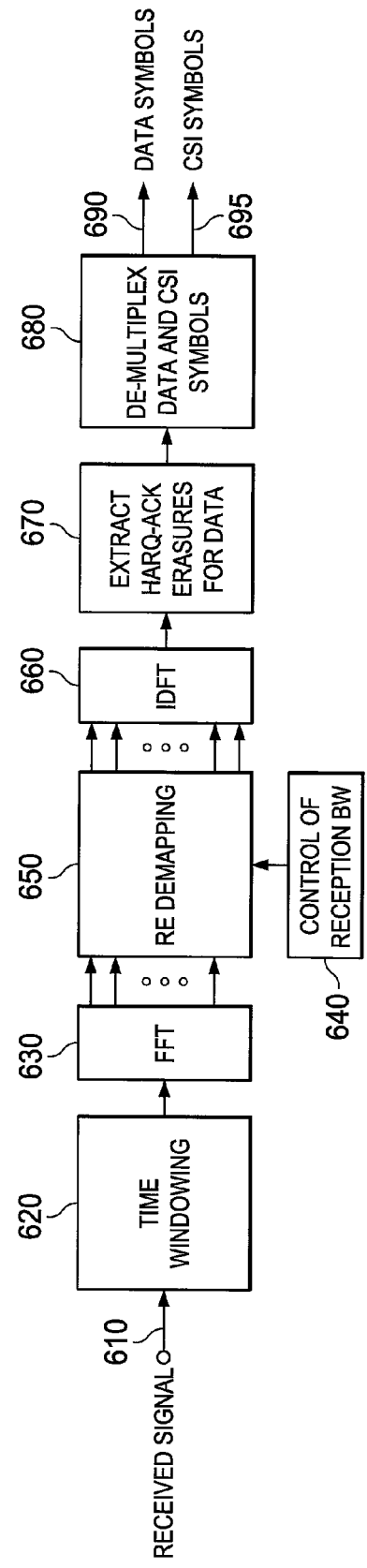
FIG. 6 illustrates an example receiver block diagram for data information and UCI in a PUSCH according to this disclosure.

FIG. 6 illustrates an example receiver block diagram for data information and UCI in a PUSCH according to this disclosure. The embodiment of the receiver 600 shown in FIG. 6 is for illustration only. Other embodiments could be used without departing from the scope of the present disclosure. In certain embodiments, receiver 600 is located within eNB 102 In certain embodiments, receiver 600 is located within UE 114.

As shown in FIG. 6, a received signal 610 is filtered by filter 620, a Fast Fourier Transform (FFT) is applied by FFT unit 630, a selector unit 640 selects REs 650 used by a transmitter, an Inverse DFT (IDFT) unit applies an IDFT 660, a de-multiplexer 670 extracts coded HARQ-ACK symbols and places erasures in corresponding REs for data symbols and CSI symbols and finally another de-multiplexer 680 separates coded data symbols 690 and coded CSI symbols 695. A reception of coded RI symbols is similar to one for coded HARQ-ACK symbols (not shown). Additional receiver circuitry such as a channel estimator, demodulators and decoders for data and UCI symbols are not shown for brevity.

A DMRS or SRS transmission can be through a transmission of a respective Zadoff-Chu (ZC) sequence (see also REF 1). For an UL system BW of $N_{RB}^{max,UL}$ RBs, a sequence $r_{u,v}^{(\alpha)}(n)$ can be defined by a Cyclic Shift (CS) $\alpha$ of a base sequence $\bar{r}_{u,v}(n)$ according to $r_{u,v}^{(\alpha)}(n)=e^{j\alpha n}\bar{r}_{u,v}(n)$, $0 \le n \le M_{sc}^{RS}=mN_{sc}^{RB}$ is a sequence length, $1 \le m \le N_{RB}^{max,UL}$, and $\bar{r}_{u,v}(n)=x_q(n \mod N_{ZC}^{RS})$ where the qth root ZC sequence is defined by $$x_q(m) = \exp\left(\frac{-j\pi m(m+1)}{N_{ZC}^{RS}}\right),$$

$0 \le m \le N_{ZC}^{RS}-1$ with q given by $q=\lfloor \bar{q}+\frac{1}{2} \rfloor+v \cdot (-1)^{\lfloor 2\bar{q} \rfloor}$ and $\bar{q}$ given by $\bar{q}=N_{ZC}^{RS} \cdot (u+1)/31$. A length $N_{ZC}^{RS}$ of a ZC sequence is given by a largest prime number such that $N_{ZC}^{RS}<M_{sc}^{RS}$. Multiple RS sequences can be defined from a single base sequence using different values of $\alpha$.

Figure 7:
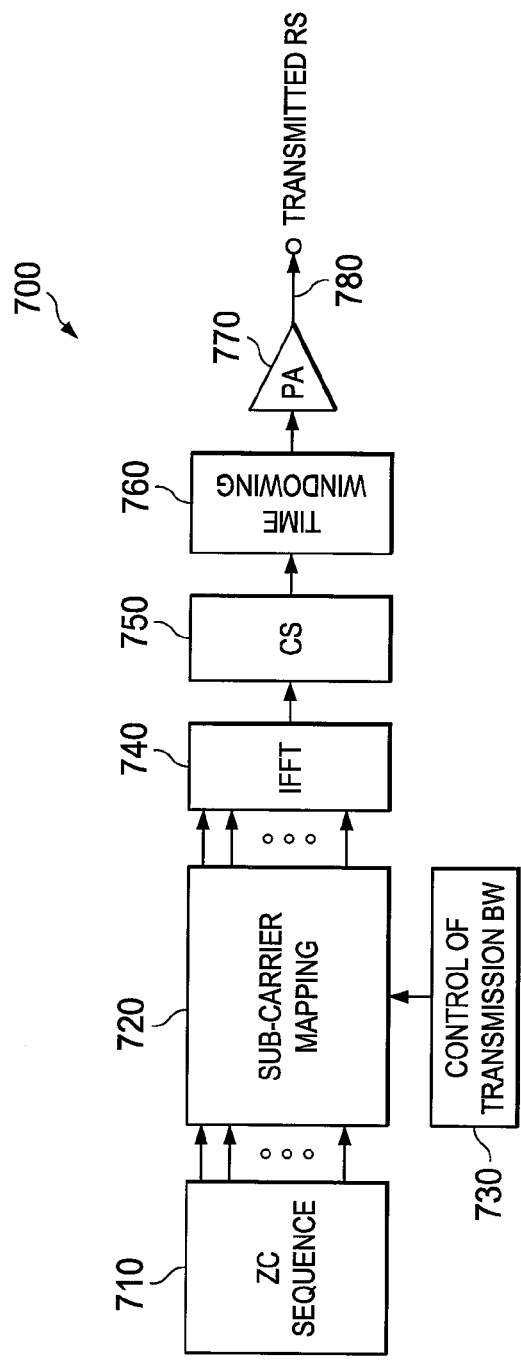
FIG. 7 illustrates an example transmitter structure for a ZC sequence that can be used as DMRS or as SRS according to this disclosure.

FIG. 7 illustrates an example transmitter structure for a ZC sequence that can be used as DMRS or as SRS according to this disclosure. The embodiment of the transmitter 700 shown in FIG. 7 is for illustration only. Other embodiments could be used without departing from the scope of the present disclosure. In certain embodiments, transmitter 700 is located within eNB 102.

As shown in FIG. 7, a mapper 720 maps a ZC sequence of length $M_{sc}^{RS}$ 710 to REs of a transmission BW as they are indicated by RE selection unit 730. The mapping can be to consecutive REs for a DMRS or to alternate REs for a SRS thereby creating a comb spectrum. Subsequently, an IFFT is performed by IFFT unit 740, a CS is applied to the output by CS unit 750, and a resulting signal is filtered by filter 760. Finally, a transmission power is applied by power amplifier 770 and the RS is transmitted 780.

TABLE 1 lists a number of combinations for a SRS transmission BW. eNB 102 can signal a SRS BW configuration c through a broadcast channel, for example 3 bits can indicate one of the eight configurations in TABLE 1. eNB 102 can then assign to each UE, such as UE 114, UE 115, UE 116 a SRS transmission BWs $m_{SRS,b}^{c}$ (in RBs) by indicating the value of b for SRS BW configuration c. For P-SRS, this can be by higher layer signaling of 2 bits. For A-SRS, this can be by a respective DCI format dynamically indicating one BW from a set of BWs configured to a UE by higher layer signaling. A variation in a maximum SRS BW is primarily intended to accommodate a varying total PUCCH size. PUCCHs are assumed to be transmitted at the two edges of an UL BW and may not be overlapped with SRS. Therefore, the larger a total PUCCH size (in RBs), the smaller a maximum SRS transmission BW. That is, as a total PUCCH size (in RBs) increases, the maximum SRS transmission BW decreases.

TABLE 1

$m_{SRS,\,b}{}^c$ RB values for UL BW of $N_{RB}{}^{UL}$
RBs with $80 < N_{RB}{}^{UL} \le 110$.

| SRS BW configuration | b = 0 | b = 1 | b = 2 | b = 3 |
|---|---|---|---|---|
| c = 0 | 96 | 48 | 24 | 4 |
| c = 1 | 96 | 32 | 16 | 4 |
| c = 2 | 80 | 40 | 20 | 4 |
| c = 3 | 72 | 24 | 12 | 4 |
| c = 4 | 64 | 32 | 16 | 4 |
| c = 5 | 60 | 20 | Not Applicable | 4 |
| c = 6 | 48 | 24 | 12 | 4 |
| c = 7 | 48 | 16 | 8 | 4 |

In a TDD communication system, a communication direction in some TTIs is in the DL, and a communication direction in some other TTIs is in the UL. TABLE 2 lists indicative UL-DL configurations over a period of 10 TTIs (a TTI has a duration of 1 millisecond (msec)), which is also referred to as frame period. "D" denotes a DL TTI, "U" denotes a UL TTI, and "S" denotes a special TTI that includes a DL transmission field referred to as DwPTS, a Guard Period (GP), and a UL transmission field referred to as UpPTS. Several combinations exist for a duration of each field in a special TTI subject to the condition that the total duration is one TTI.

TABLE 2

TDD UL-DL configurations

| TDD UL-DL Configu- ration | DL-to-UL Switch-point periodicity | TTI number | | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The TDD UL-DL configurations in TABLE 2 provide 40% and 90% of DL TTIs per frame to be DL TTIs (and the remaining to be UL TTIs). Despite this flexibility, a semi-static TDD UL-DL configuration that can be updated every 640 msec or less frequently, by signaling of a System Information Block (SIB) or, in case of DL Carrier Aggregation and secondary cell, by RRC signaling (see also REF 3 and REF 4), may not match well with short-term data traffic conditions. For the remaining of this disclosure, such a TDD UL-DL configuration will be referred to as a conventional (or non-adapted) TDD UL-DL configuration and it is assumed to be used by conventional (or legacy) UEs in a cell. For this reason, a faster adaptation period of a TDD UL-DL configuration can improve system throughput, particularly for a low or moderate number of connected UEs. For example, when there is more DL traffic than UL traffic, a conventional TDD UL-DL configurations can be adapted every 10, 20, 40, or 80 msec to a different TDD UL-DL configuration that includes more DL TTIs. Signaling for faster adaptation of a TDD UL-DL configuration can be provided by several mechanisms, including signaling a DCI format in a PDCCH.

An operating constraint in an adaptation of a conventional TDD UL-DL configuration, in ways other than conventional ones, is the possible existence of UEs that cannot be aware of such adaptation. Such UEs are referred to as conventional UEs. Since conventional UEs perform measurements in DL TTIs using a respective CRS, such DL TTIs cannot be changed to UL TTIs or to special TTIs by a faster adaptation of the conventional TDD UL-DL configuration. However, an UL TTI can be changed to a DL TTI without impacting conventional UEs because eNB 102 can ensure that such UEs do not transmit any signals in such UL TTIs. In addition, an UL TTI common to all TDD UL-DL configurations could exist to enable eNB 102 to possibly select this UL TTI as the only UL one. In some implementations, including all TDD-UL-DL configurations in TABLE 2, this UL TTI is TTI#2.

A TTI is referred to as DL flexible TTI if it is an UL TTI in a conventional TDD UL-DL configuration and is adapted to a DL TTI in an adapted TDD UL-DL configuration. A TTI is referred to as UL flexible TTI if it is an UL TTI in a conventional TDD UL-DL configuration that could be adapted to a DL TTI in an adapted TDD UL-DL configuration but it remains an UL TTI. Considering the above, TABLE 3 indicates flexible TTIs (denoted by 'F') for each TDD UL-DL configuration in TABLE 2. Evidently, as DL TTIs in a conventional TDD UL-DL configuration cannot be changed to UL TTIs, not all TDD UL-DL configurations can be used for adaptation. For example, if TDD UL-DL configuration 2 is the conventional one, an adaptation can be only to TDD UL-DL configuration 5. Also, a use of a configured TDD UL-DL configuration for a UE to derive UL TTIs for HARQ-ACK transmissions further restricts TDD UL-DL configuration that can be used for adaptation as such UL TTIs are then UL fixed TTIs. Therefore, an indication for an adaptation for a TDD UL-DL configuration can be considered by UE 114 as invalid if, for example, UE 114 adapts a DL TTI in the conventional TDD UL-DL configuration in an UL TTI. Invalid indications can be caused, by example, by the misdetection from UE 114 of a DCI format conveying an indication for an adapted TDD UL-DL configuration.

TABLE 3

Flexible TTIs (F) for TDD UL-DL configurations

| TDD UL-DL Configu- ration | DL-to-UL Switch-point periodicity | TTI number | | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | F | F | D | F | F | F | F |
| 1 | 5 ms | D | S | U | F | D | D | F | F | F | D |
| 2 | 5 ms | D | S | U | D | D | D | F | F | D | D |
| 3 | 10 ms | D | S | U | F | F | D | D | D | D | D |
| 4 | 10 ms | D | S | U | F | D | D | D | D | D | D |
| 5 | 10 ms | D | S | U | D | D | D | D | D | D | D |
| 6 | 5 ms | D | S | U | F | F | D | F | F | F | D |

If an eNB can adapt a TDD UL-DL configuration more frequently than by RRC signaling, for example using physical layer signaling, then flexible TTIs (which can be only UL TTIs in the conventional TDD UL-DL configuration) should not carry any periodic UL signaling from conventional UEs as this is configured by RRC signaling. This implies that in flexible TTIs conventional UEs should not be configured transmissions of SRS, or CSI, or SR, or HARQ-ACK signaling in response to SPS PDSCH. Additionally, if a reference TDD UL-DL configuration is used for HARQ-ACK signaling in response to PDSCH receptions, a respective UL TTI should not be adapted to a DL TTI and, therefore, it is not a flexible TTI. However, there is a need for a UE to transmit SRS in UL flexible TTIs since, as it is further subsequently discussed, the interference experienced by a signal transmission from the UE can be different than in UL fixed TTIs and an eNB needs to obtain a respective UL CSI for the UE in a flexible TTI.

Figure 8:
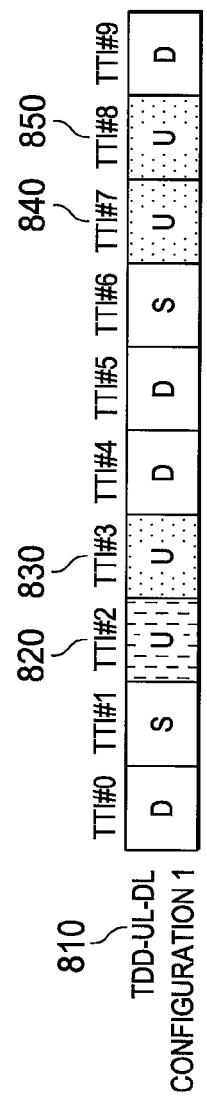
FIG. 8 illustrates an example presence or absence of UL control signaling or UL periodic signaling in an UL TTI according to this disclosure.

FIG. 8 illustrates an example presence or absence of UL control signaling or UL periodic signaling in an UL TTI according to this disclosure. The embodiment of the signaling shown in FIG. 8 is for illustration only. Other embodiments could be used without departing from the scope of the present disclosure.

As shown in FIG. 8, assuming TDD UL-DL configuration 1 is a conventional TDD UL-DL configuration 810, TTI#2 820 is of UL fixed direction while TTI#3 830, TTI#7 840, and TTI#8 850 are of flexible direction. As it is possible for these flexible TTIs to be configured as DL TTIs at a rate faster than an RRC configuration rate, they may not be configured with periodic signaling, such as periodic CSI, SR, periodic SRS, and SPS PUSCH, from conventional UEs. Moreover, for simplifying a timeline for HARQ-ACK transmissions in response to scheduled PDSCH receptions, these flexible TTIs may also not be used for dynamic HARQ-ACK transmissions. Then, all these aforementioned UL transmissions need to occur in the UL fixed TTI.

To extend a transmission bandwidth for UE 114 and support higher data rates, Carrier Aggregation (CA) can be used, where multiple component carriers (or cells) are aggregated and jointly used for transmission to the UE (DL CA) or from the UE (UL CA). In some implementations, up to five component carriers can be aggregated for UE 114. The number of component carriers used for DL CA can be different than the number of component carriers used for UL CA. Before CA is configured, UE 114 may have only one RRC connection with a network. One serving cell provides the mobility information at RRC connection establishment/re-establishment/handover, and one serving cell provides the security input at RRC connection re-establishment/handover. This cell is referred to as the Primary Cell (PCell). A DL carrier corresponding to the PCe 11 is referred to as a DL Primary Component Carrier (DL PCC), and its associated UL carrier is referred to as a UL Primary Component Carrier (UL PCC). Depending on UE capabilities, DL or UL Secondary Cells (SCells) can be configured to form (together with the PCe 11) a set of serving cells. A carrier corresponding to an SCell is referred to as a DL Secondary Component Carrier (DL SCC) in the DL, while it is referred to as a UL Secondary Component Carrier (UL SCC) in the UL. The PCell and the SCells configured for UE 114 may not have the same TDD UL-DL configuration or reconfiguration. In case an eNB supports CA and adaptation of TDD UL-DL configurations, a DCI format indicating adapted TDD UL-DL configurations can include respective three-bit indicators for multiple cells.

Embodiments of this disclosure provide a mechanism for supporting periodic SRS transmissions in an UL flexible TTI that, in addition, can be substantially over a bandwidth available for PUSCH transmissions. Embodiments of this disclosure also provide a mechanism for supporting aperiodic SRS transmissions in an UL flexible TTI that, in addition, can be substantially over a bandwidth available for PUSCH transmissions. Embodiments of this disclosure provide a mechanism for a UE to determine if an aperiodic SRS transmission is for an UL fixed TTI or for an UL flexible TTI. Embodiments of this disclosure also provide a mechanism for supporting periodic CSI transmissions for a DL flexible TTI in a PUCCH. Embodiments of this disclosure provide a mechanism for supporting aperiodic CSI transmissions for a DL flexible TTI in a PUSCH. Embodiments of this disclosure also provide a mechanism for UE 114 to determine if an aperiodic CSI transmission is for a DL fixed TTI or for a DL flexible TTI. Moreover, embodiments of this disclosure provide a mechanism for eNB 102 to perform DL link adaptation for UE 114 in a DL fixed TTI or in a DL flexible TTI based, respectively, on a reception of a SRS that is transmitted from UE 114 in an UL flexible TTI or in an UL fixed TTI. Furthermore, embodiments of this disclosure provide a mechanism for UE 114 to measure CSI for a first set of TTIs that includes DL fixed TTIs and for a second set of TTIs that includes DL flexible TTIs.

Support of a P-SRS Transmissions in an UL Flexible TTI

In certain embodiments, upon an adaptation of a TDD UL-DL configuration, it is desirable for eNB 102 to obtain as early as possible an UL CSI for an UL flexible TTI from UE 114 in order to determine an interference experienced by UE 114, which can be different than an interference experienced in an UL fixed TTI, and perform link adaptation for respective PUSCH transmissions in UL flexible TTIs before a next adaptation of a TDD UL-DL configuration in its own cell or in a different cell as this would again change the interference characteristics. Triggering A-SRS transmission from UE 114 can achieve this objective for some UEs but cannot be a general solution due to associated PDCCH resource requirements for scheduling PUSCH transmissions in UL flexible TTIs, preferably as soon as possible after a TDD UL-DL configuration adaptation, and as not all UEs may require such PUSCH transmissions.

To avoid relying on an availability of PDCCH resources or on an existence of data to transmit in PUSCHs by respective UEs in UL flexible TTIs after a TDD UL-DL configuration adaptation, embodiments of the present disclosure consider that P-SRS transmissions in an UL flexible TTI are configured to UE 114 separately from P-SRS transmissions in an UL fixed TTI. P-SRS transmissions in an UL flexible TTI occur only when UE 114 knows that the communication direction in that TTI is in the UL (as determined by signaling, such as a DCI format transmitted in a PDCCH indicating an adapted TDD UL-DL configuration); otherwise, if the communication direction in a flexible TTI is in the DL or if UE 114 does not know the actual communication direction (DL or UL) in a flexible TTI, due to an inability to receive the previous signaling, UE 114 does not transmit P-SRS. The UL flexible TTI with the P-SRS transmission can be, for example, the first UL flexible TTI in an adapted TDD UL-DL configuration, or can be a first UL flexible TTI in a set of configured TTIs to UE 114. P-SRS transmissions in an UL fixed TTI always occur with a configured periodicity until reconfigured by higher layer signaling from eNB 102. Moreover, as it is subsequently discussed, as some UEs may experience different interference in respective different UL flexible TTIs, P-SRS transmissions may be configured in multiple UL flexible TTIs in a same frame. Nevertheless, it is also possible for a P-SRS transmission to be triggered only by the DCI format in the respective PDCCH. Then, P-SRS is similar to A-SRS but instead of a single transmission, a transmission can be periodic as long as the flexible TTI is an UL flexible TTI.

As P-SRS transmission parameters are both UE-common (informed to UEs by SIB signaling) and UE-specific (informed to UEs by UE-specific higher layer signaling such as RRC signaling), UE-common P-SRS transmission parameters in an UL flexible TTI can be implicitly derived from respective ones in an UL fixed TTI while UE-specific P-SRS transmission parameters in UL flexible TTIs can be informed by separate higher layer signaling than in UL fixed TTIs. UE 114 can be informed that eNB 102 applies TDD UL-DL configuration adaptation either by reserved fields in a SIB, that cannot be interpreted by conventional UEs, or by higher layer signaling after UE 102 connects to eNB 102 as conventional UE.

UE-common P-SRS parameters for a UL fixed TTI include:
a) P-SRS BW configuration.
b) P-SRS transmission TTIs (starting TTI and periodicity of TTIs where P-SRS can be transmitted; for example, the starting TTI can be TTI#2 and P-SRS transmission TTIs can occur every 5 TTIs or every 10 TTIs).
c) Whether a UE multiplexes a P-SRS transmission and a HARQ-ACK signal transmission in a PUCCH or drops P-SRS transmission when it transmits a HARQ-ACK signal in a PUCCH.
d) Number of UpPTS symbols for transmitting P-SRS, if applicable (can be either one or two).

In a first approach for a SRS BW configuration, since UL flexible TTIs are considered to not contain PUCCH or SPS PUSCH transmissions from conventional UEs and also not contain such transmissions from UEs supporting TDD UL-DL configuration adaptations on a faster time scale, all UL BW in UL flexible TTIs can become available for PUSCH transmissions. Therefore, a P-SRS transmission can extend over all UL BW in order to provide a respective UL CSI. Moreover, due to the duality of a UL/DL channel in TDD operation, information provided by SRS may also be used, at least partially, for link adaptation of PDSCH transmissions (possibly together with additional information as it is further subsequently discussed). Then, for example, P-SRS transmission BW configuration c=0 as listed in TABLE 1 (or another P-SRS BW configuration with maximum BW equal to or larger than the one used for P-SRS transmissions in UL fixed TTIs) can be used for SRS transmissions in UL flexible TTIs regardless of the P-SRS transmission BW configuration signaled by a SIB for UL fixed TTIs. Therefore, the SRS BW configuration in UL flexible TTIs can be separately informed to UE 114 by including it in a higher layer signaling or can be specified in a system operation.

Figure 9:
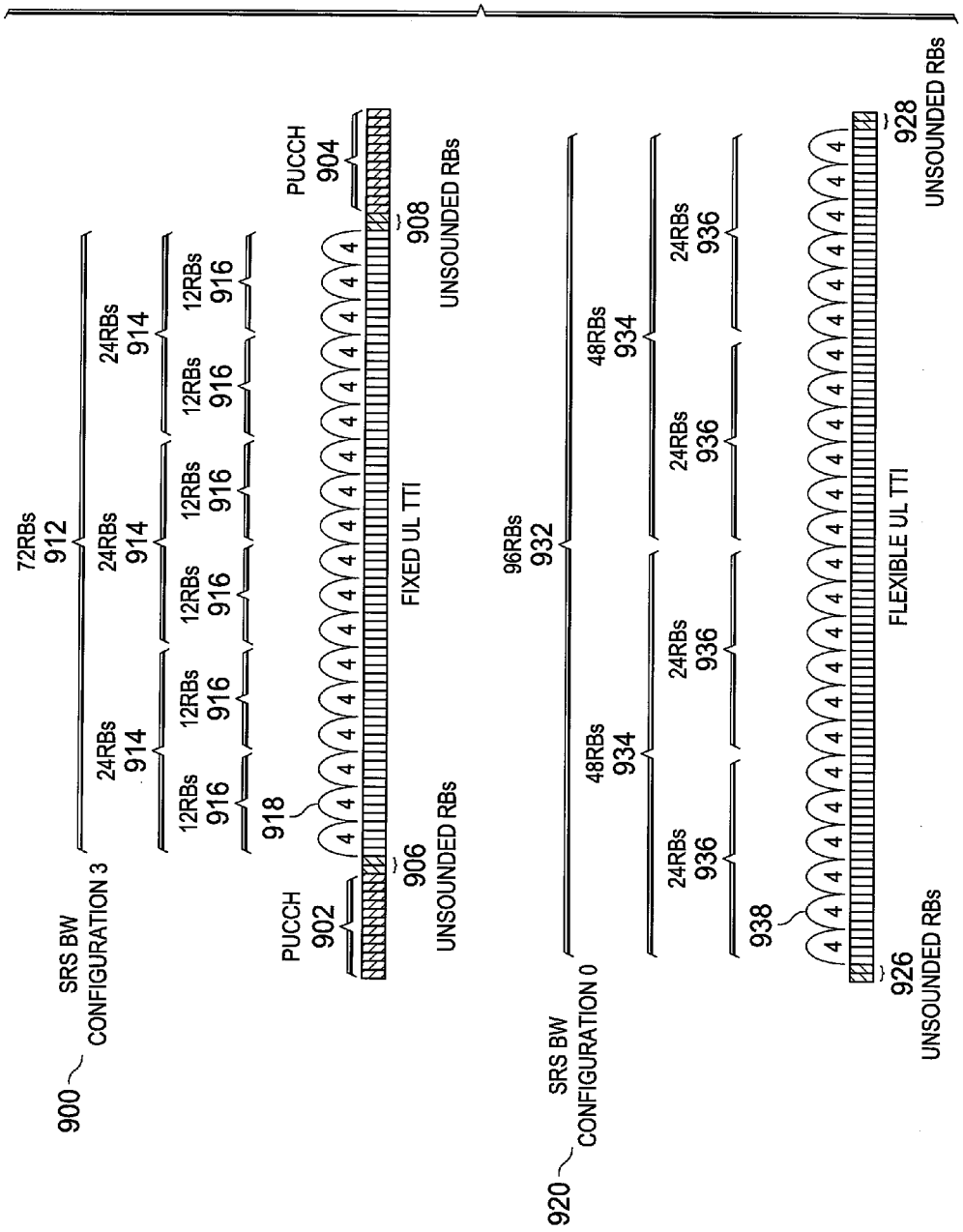
FIG. 9 illustrates an example adaptation of SRS BW configuration in UL flexible TTIs relative to UL fixed TTIs according to this disclosure.

FIG. 9 illustrates an example adaptation of SRS BW configuration in an UL flexible TTI relative to an UL fixed TTI according to this disclosure. The embodiment of the SRS BW configuration shown in FIG. 9 is for illustration only. Other embodiments could be used without departing from the scope of the present disclosure.

As shown in FIG. 9, in an UL fixed TTI, a SIB informs of SRS BW configuration c=3 900. PUCCH RBs are located at the two UL BW edges 902 and 904. As SRS transmission in PUCCH RBs is not beneficial for link adaptation and as simultaneous transmission in a same RB of SRS and PUCCH may not be universally supported for all PUCCH types, SRS transmission is typically constrained in RBs that can be used for PUSCH transmission. Therefore, the larger the PUCCH size (in RBs), the smaller the maximum SRS transmission BW should be and the SRS BW configurations in TABLE 1 support such functionality. UE 114 is configured by higher layer signaling a P-SRS transmission BW with either $m_{SRS,0}^3$=72 RBs 912, or $m_{SRS,1}^3$=24 RBs 914, or $m_{SRS,2}^3$=12 RBs 916, or $m_{SRS,3}^3$=4 RBs 918. A few RBs, 906 and 908, may not be sounded but this usually does not affect an ability of eNB 102 to perform link adaptation for PUSCH transmissions that include those RBs as a respective UL CSI may be interpolated from adjacent RBs where SRS is transmitted. For SRS BWs other than the maximum one, eNB 102 assigns to UE 114 a starting frequency position for a P-SRS transmission by higher layer signaling. In an UL flexible TTI, SRS BW configuration c=0 920 (or another SRS BW configuration with larger maximum BW than SRS BW configuration 3) is either default or indicated by additional system information which does not need to be interpreted by conventional UEs. A few RBs, 926 and 928, may again not be sounded by SRS but as previously mentioned this can have a negligible impact. Moreover, as is subsequently discussed, some PUCCH transmissions may also be supported in RBs where SRS is not transmitted. UE 114 is configured by higher layer signaling a SRS transmission BW with either $m_{SRS,0}^0$=96 RBs 932, or $m_{SRS,1}^0$=24 RBs 934, or $m_{SRS,2}^0$=12 RBs 936, or $m_{SRS,3}^0$=4 RBs 938.

In a second approach for the SRS BW configuration in a reference cell, the BW in an UL flexible TTI can be divided into a first BW used for UL transmissions and a second BW that is not used for UL transmissions. In a neighboring cell using a different TDD UL-DL configuration than the reference cell, the BW in the DL flexible TTI can be divided into a first BW that is not used for DL transmissions and into a second BW used for DL transmissions. In this manner, UL transmissions in the reference cell do not experience interference from DL transmissions in the neighboring cell (and the reverse). This first BW can be informed to UE 114 by higher layer signaling or it can be specified in the operation of the communication system.

With the second approach, a P-SRS transmission can extend (partially or fully) over the first BW allocated to UL transmissions in order to provide a respective UL CSI. A respective SRS BW configuration can follow from the ones in TABLE 1 but a respective maximum SRS BW may not be supported if it is larger than the first BW. The flexible TTIs for which UE 114 shall apply the above SRS transmission parameters can be indicated to UE 114 either by the DL signaling performing an adaptation of a TDD UL-DL configuration or it can be indicated, explicitly or implicitly, by a DCI format scheduling a PDSCH or a PUSCH in the flexible TTI. For example, an explicit indication can be by including an Information Element (IE) in the DCI formats for UEs configured for adaptation of a TDD UL-DL configuration indicating whether UE 114 should use a first set of parameters or a second set of parameters for a PUSCH or a SRS transmission in a flexible TTI. An implicit indication can be similar to the explicit one using a specific state of an existing IE.

Alternatively, with the second approach, the maximum SRS BW may still be supported by puncturing the last TTI symbol for PDSCH transmissions. Due to the channel duality in TDD, this can allow eNB 102 to obtain some channel information also for the DL.

Figure 10:
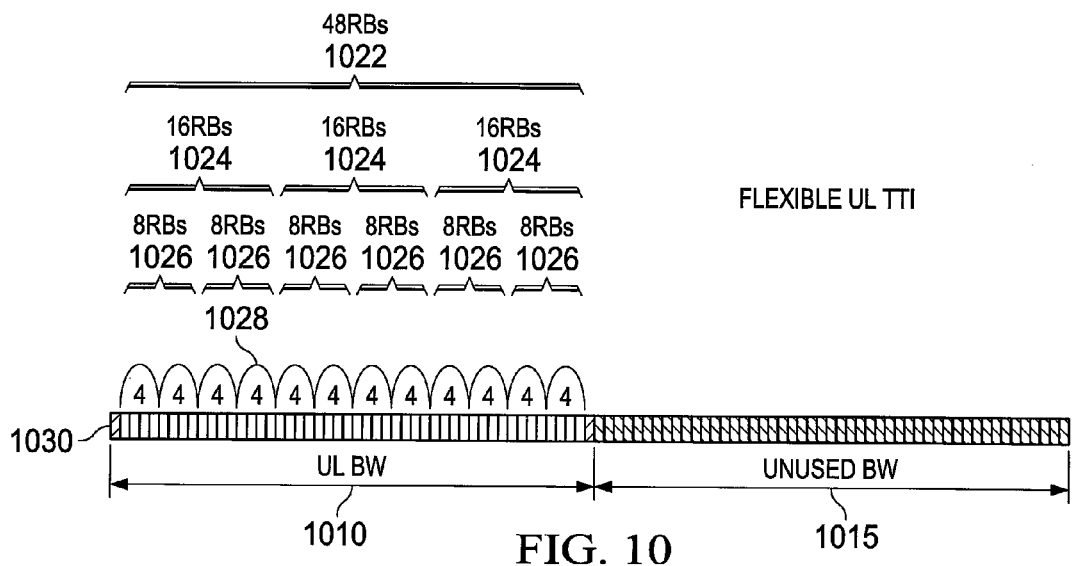
FIG. 10 illustrates an example adaptation of SRS BW configuration in UL flexible TTIs when an UL BW is a fraction of an UL BW in UL fixed TTIs according to this disclosure.

FIG. 10 illustrates an example adaptation of SRS BW configuration in an UL flexible TTI when an UL BW is a fraction of an UL BW in an UL fixed TTI according to this disclosure. The embodiment of the SRS BW configuration shown in FIG. 10 is for illustration only. Other embodiments could be used without departing from the scope of the present disclosure.

As shown in FIG. 10, a total UL BW consists of 100 RBs and is divided into a first UL BW 1010 consisting of 50 RBs and into a second BW 1015 consisting of 50 RBs. UL transmissions from UE 114 occur only in the first BW. The SRS BW configuration can then be determined from TABLE 1 and can support a maximum SRS transmission BW that is equal to or smaller than the first UL BW. For example, SRS BW configuration c=7 can be used with $m_{SRS,0}^0$=48 RBs 1022, or $m_{SRS,1}^0$=24 RBs 1024, or $m_{SRS,2}^0$=12 RBs 1026, or $m_{SRS,3}^0=4$ RBs 1028. A few RBs, 1030 may again not be sounded by SRS. A SRS BW configuration in an UL fixed TTI remains as in FIG. 9.

For the P-SRS transmission TTIs in case of UL flexible TTIs, UEs, such as UE 114, can implicitly obtain this information from a respective one for UL fixed TTIs or this information can also be included in higher layer signaling configuring P-SRS transmissions in UL flexible TTIs. The starting UL flexible TTI can be the one immediately after the starting UL fixed TTI or can be the first UL flexible TTI in a frame and a periodicity for P-SRS transmissions in an UL flexible TTIs can be same or larger (as dictated by an availability of UL flexible TTIs per frame) as in UL fixed TTIs. For example, for TDD UL-DL configuration 2, if SIB signaling indicates UL fixed TTI#2 as a starting P-SRS transmission UL TTI and a P-SRS transmission periodicity of 5 UL TTIs (implying that TTI#7 also becomes an UL fixed TTI), a starting P-SRS transmission in an UL flexible TTI can be in UL TTI#3 and a periodicity of UL flexible TTIs supporting P-SRS transmissions can remain 5 UL TTIs and include UL flexible TTI#8. Therefore, a P-SRS transmission periodicity in a second set of TTIs that includes UL flexible TTIs can be same as a P-SRS transmission periodicity in a first set of TTIs that includes UL fixed TTIs. For TDD UL-DL configuration 3, if SIB signaling indicates UL fixed TTI#2 as an UL TTI of starting P-SRS transmission and a P-SRS transmission periodicity of 10 UL TTIs, a starting P-SRS transmission in an UL flexible TTI can be in UL TTI#3 and a periodicity of UL flexible TTIs supporting P-SRS transmissions can remain 10 UL TTIs.

For the multiplexing of HARQ-ACK signaling and P-SRS or for the number of UpPTS symbols where P-SRS is transmitted, the choice signaled by a SIB for P-SRS transmissions in UL fixed TTIs also applies for UL flexible TTIs.

For P-SRS transmission parameters informed to UE 114 by higher layer signaling, such as RRC signaling, as previously mentioned separate RRC signaling can be used for P-SRS transmissions in UL fixed TTIs and UL flexible TTIs. Therefore, a P-SRS transmission BW, frequency domain position, transmission periodicity, hopping BW, cyclic shift, and frequency comb for an UL flexible TTI can be provided to UE 114 by separate higher layer signaling (in addition to the higher layer signaling providing these parameters for UL fixed TTIs). If an adaptation to any possible TDD UL-DL configuration is to be supported, a P-SRS transmission periodicity can be at least 10 TTIs.

Support of A-SRS Transmissions in an UL Flexible TTI

In certain embodiments, similar to P-SRS transmissions in UL flexible TTIs, parameters for A-SRS transmissions in UL flexible TTIs can be separately configured (than A-SRS transmissions in UL fixed TTIs). For example, for a A-SRS transmission triggered by a DCI format transmitted in a PDCCH scheduling a PUSCH, an A-SRS request field including one or two binary elements can indicate one set or three sets of A-SRS transmission parameters (assuming that one value of the A-SRS request field indicate no A-SRS transmission) that can include a transmission BW, a frequency domain position, a cyclic shift, a frequency comb, and a number of respective UE transmitter antennas if UE 114 has more than one transmitter antenna. In general, an eNB can configure UE 114 with two sets of TTIs where typically a first set can contain fixed TTIs and a second set can contain flexible TTIs.

Figure 11:
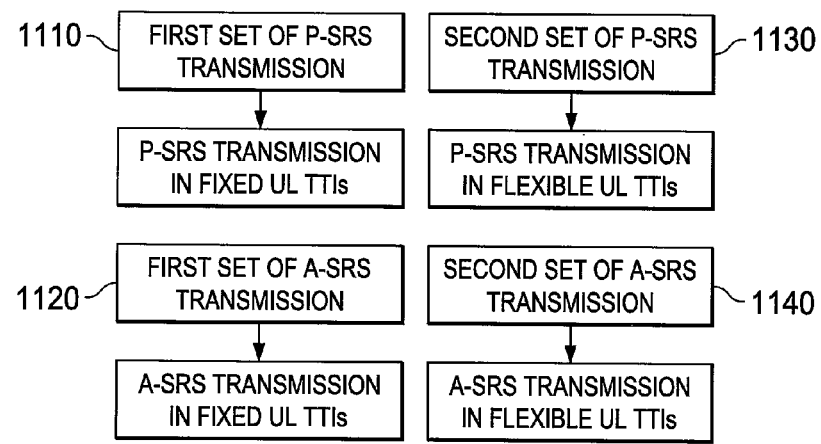
FIG. 11 illustrates an example use of a first UE-specific higher layer signaling for P-SRS or A-SRS transmission parameters in UL fixed TTIs and of a second UE-specific higher layer signaling for P-SRS or A-SRS transmission parameters in UL flexible TTIs according to this disclosure.

FIG. 11 illustrates an example use of a first UE-specific higher layer signaling for P-SRS or A-SRS transmission parameters in an UL fixed TTI and of a second UE-specific higher layer signaling for P-SRS or A-SRS transmission parameters in an UL flexible TTI according to this disclosure. The embodiment shown in FIG. 11 is for illustration only. Other embodiments could be used without departing from the scope of the present disclosure.

As shown in FIG. 11, UE 114 is informed by first higher layer signaling of a first set of SRS transmission parameters 1110 for use in an UL fixed TTI 1120 and by second higher layer signaling of a second set of P-SRS transmission parameters 1130 for use in an UL flexible fixed TTI 1140. The SRS transmission parameters can be different for P-SRS and for A-SRS and can include one or more of a respective transmission BW, a starting frequency position, a cyclic shift of a ZC sequence, a spectral comb, and a number of UE transmitter antennas (in case of multiple antennas, SRS transmission parameters other than ones for a first antenna are implicitly derived from the ones for the first antenna).

Selection of UL TTI for an A-SRS Transmission

In certain embodiments, a determination of an UL TTI for an A-SRS transmission is considered when UE 114 receives an A-SRS request in a DCI format scheduling a PDSCH transmission to UE 114. An UL TTI for an A-SRS transmission triggered by a PDCCH in DL TTI n is conventionally determined as a first UL TTI satisfying $n+k$, $k \geq 4$ and $(10 \cdot n_f+k_{SRS}-T_{offset,1})\bmod T_{SRS,1}=0$ where $k_{SRS}$ is a TTI index within a frame $n_f$, $T_{offset,1}$ is an A-SRS TTI offset, $T_{SRS,1}$ is an A-SRS periodicity. This conventional determination of an UL TTI for an A-SRS transmission can result to an A-SRS transmitted either an UL fixed TTI or in an UL flexible TTI.

One option to resolve the above ambiguity is to re-interpret the A-SRS trigger in case of an adapted TDD UL-DL configuration as applying for A-SRS transmission in both an UL fixed TTI and an UL flexible TTI. Moreover, for UEs supporting adaptation of a TDD UL-DL configuration, the above constraint for $k \geq 4$ can be relaxed to $k \geq 1$.

If more refined control of whether an UL TTI of an A-SRS transmission should be in an UL fixed TTI or an UL flexible TTI is desired in order to avoid unnecessary overhead compared to triggering A-SRS transmissions for both UL TTI types, eNB 102 can be restricted to transmitting a respective PDCCH in a predetermined DL TTI type associated with a respective UL TTI type. For example, triggering an A-SRS transmission in an UL flexible TTI or in an UL fixed TTI can be associated, respectively, with a DCI format scheduling a PDSCH that is transmitted in a DL flexible TTI or in a DL fixed TTI.

In general, a capability should be provided to eNB 102 to schedule PDSCH in any respective DL TTI type (fixed or flexible) and simultaneously trigger A-SRS transmission in any UL TTI type by decoupling an UL TTI of an A-SRS transmission and a DL TTI of a respective PDCCH transmission.

A first option to provide the above flexibility to an eNB 102 scheduler for operation in TDD systems is to extend the A-SRS request field by 1 bit by including an UL TTI type A-SRS indicator field. This additional bit can indicate whether an intended UL TTI for A-SRS transmission is a fixed one or a flexible one. The determination is subject to the aforementioned conditions but if they indicate, for example, an UL fixed TTI while the UL TTI type A-SRS indicator field indicates an UL flexible TTI, the A-SRS is transmitted in the first UL flexible TTI after the UL fixed TTI. Although this option can provide full flexibility to eNB 102 scheduler, it effectively increases a size of an A-SRS request field. Moreover, although the description is with respect to a separate UL TTI type A-SRS indicator field, a same functionality is achieved by extending an A-SRS request field by 1 bit and having some of the states of A-SRS transmission parameters include an UL fixed TTI and remaining ones include an UL flexible TTI.

Figure 12:
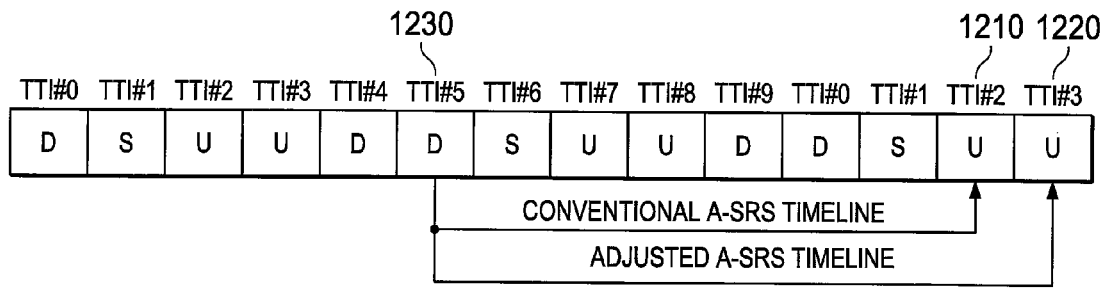
FIG. 12 illustrates an example use of an UL TTI type A-SRS indicator field according to this disclosure.

FIG. 12 illustrates an example use of an UL TTI type A-SRS indicator field according to this disclosure. The embodiment of the UL TTI type A-SRS indicator field shown in FIG. 12 is for illustration only. Other embodiments could be used without departing from the scope of the present disclosure.

As shown in FIG. 12, assuming an adapted TDD UL-DL configuration is TDD UL-DL configuration 1, UL TTI#2 1210 is an UL fixed TTI and UL TTI#3 1220 is an UL flexible TTI. If UE 114 detects a PDCCH in DL TTI#5 1230 triggering an A-SRS transmission in UL TTI#2 subject to conventional conditions while an UL TTI type A-SRS indicator field indicates an UL flexible TTI, the UE transmits the A-SRS in UL TTI#3.

A second option which trades off flexibility for additional overhead avoidance is to associate the DL TTI type of a PDCCH detection triggering an A-SRS transmission with the UL TTI type of the A-SRS transmission. If the DL TTI of a PDCCH transmission triggering an A-SRS transmission is fixed or flexible, the respective UL TTI for the A-SRS transmission is correspondingly fixed or flexible. If there are no UL flexible TTIs, then regardless of the DL TTI type for a PDCCH triggering an A-SRS, the A-SRS is evidently transmitted in an UL fixed TTI. It is noted that for any adaptation of a TDD UL-DL configuration, since DL TTIs of a conventional TDD UL-DL configuration cannot be changed to UL TTIs, there are always DL flexible TTIs.

A third option is to associate a value of an existing A-SRS request field with an UL TTI type for a respective A-SRS transmission. For example, for an A-SRS request field including 2 bits, a '01' value indicates a first conventional set of A-SRS transmission parameters and also indicates A-SRS transmission in an UL fixed TTI while a '10' value indicates a second conventional set of A-SRS transmission parameters and also indicates A-SRS transmission in an UL flexible TTI.

Periodic CSI Feedback for DL Fixed TTIs and for DL Flexible TTIs

In certain embodiments, P-CSI feedback for DL flexible TTIs is considered. In addition to providing an UL CSI, due to the DL/UL channel duality in a TDD system, a SRS transmission can also provide a channel estimate for the DL channel. However, as interference conditions are different in an UL and a DL of a TDD system, a separate CSI feedback is required by UE 114 in order for eNB 102 to obtain information of SINR conditions experienced by DL signal transmission to UE 114 over the DL system BW. Due to difference in interference conditions in DL fixed TTIs and DL flexible TTIs, embodiments of the present disclosure consider that UE 114 provides a first CSI for a DL fixed TTI and a second CSI for a DL flexible TTI. As a channel experienced by DL transmissions to UE 114 is practically same in a DL fixed TTI and in a DL flexible TTI in a same frame, the above is functionally equivalent to UE 114 providing a first Interference Measurement Report (IMR) for a DL fixed TTI and a second IMR for a DL flexible TTI (assuming that the DL channel is known). As the first CSI and the second CSI are obtained in different TTIs, they can correspond to different ZP CSI-RS configurations (no additional NZP CSI-RS configuration is needed). Therefore, a conventional restriction that UE 114 is not expected to receive CSI-IM resource configurations that are not all overlapping with one ZP CSI-RS resource configuration is no longer applicable. Moreover, considering that a DL fixed TTI and a DL flexible TTI can, in general, occur consecutively in time (see TABLE 3), CSI-IM resources can be configured in successive DL TTIs at least for DL flexible TTIs. Similar to the P-SRS transmission, UE 114 can assume that CSI-IM resources exist only in a first DL flexible TTI or can assume that they exist in each flexible TTI in a configured set of flexible TTIs when the flexible TTI is indicated by the signaling adapting a TDD UL-DL configuration as a DL flexible TTI. A CSI from UE 114 can be provided to eNB 102 by a P-CSI report in a PUCCH or an A-CSI report in a PUSCH.

A ZP CSI-RS in a DL flexible TTI can be supported similar to a P-SRS in an UL flexible TTI. CSI-IM resources and associated ZP CSI-RS parameters are configured to UE 114 by higher layer signaling, such as RRC signaling, can include a ZP CSI-RS pattern index for ZP CSI-RS resources (see also REF 1), a ZP CSI-RS periodicity, and a DL TTI offset for a ZP CSI-RS in a frame (see also REF 3). eNB 102 can configure by separate higher layer signaling the above ZP CSI-RS parameters in flexible TTIs. Alternatively, UE 114 can assume that a subset of the above ZP CSI-RS parameters is same in flexible TTIs as in fixed TTIs and remaining parameters, if any, can be provided by higher layer signaling (in advance of adapting a TDD UL-DL configuration) or be implicitly derived. A TTI offset can correspond to a first DL flexible TTI after an adaptation of a TDD UL-DL configuration, or CSI-IM resources can exist in flexible TTIs informed to UE 114 by higher layer signaling when they are DL flexible TTIs, or CSI-IM resources can exist in every flexible TTI when it is a DL flexible TTI. If UE 114 detects an adaptation of a TDD UL-DL configuration switching an UL TTI to a DL TTI and if UE 114 determines (either explicitly by higher layer signaling or by an implicit predetermined rule as previously described) that the DL TTI includes a ZP CSI-RS configuration and, therefore, associated CSI-IM resources, UE 114 can then perform respective interference measurements. Each respective interference measurement can be restricted in the DL TTI of a respective ZP CSI-RS transmission and may not include ZP CSI-RS resources in other DL TTIs. This is further discussed in a subsequent embodiment. Therefore, separate CSI-IM resources for interference measurements can be associated with a DL fixed TTI and with a DL flexible TTI, each such CSI-IM resources need not belong to a same ZP CSI-RS resource configuration, and a conventional restriction that UE 114 is not expected to receive CSI-IM resource configurations that are not all completely overlapping with one ZP CSI-RS resource configuration does not apply.

Similar to the second approach of the first embodiment of the present disclosure for the transmission of P-SRS in an UL flexible TTI, a BW can be divided in a first BW and in a second BW and UE 114 can assume that DL transmissions in a DL flexible TTI can occur only in the second BW. In that case, UE 114 can perform measurements based on a CSI-RS in such flexible TTI only over the second BW. UE 114 can be informed of a first BW (and therefore of a second BW) by eNB 102 through higher layer signaling.

A first option for multiplexing a P-CSI report for a measurement in a DL fixed TTI with a P-CSI report for a measurement in a DL flexible TTI is time domain multiplexing. Then, eNB 102 can provide separate higher layer signaling to UE 114 informing of P-CSI transmission parameters for reporting measurements obtained in DL fixed TTIs and in DL flexible TTIs. Such parameters include an UL TTI and a periodicity for a P-CSI transmission, contents of a P-CSI transmission (such as only CQI or both CQI and PMI), and parameters for determining a PUCCH resource for a P-CSI transmission for a respective PUCCH format. If the two aforementioned P-CSI report types need to be transmitted in a same UL TTI then, if UE 114 is not capable of simultaneously transmitting more than one PUCCH, UE 114 shall prioritize for transmission one P-CSI report and suspend transmission of the other P-CSI report. As eNB 102 needs to know the relevance of a P-CSI report, a rule needs to apply for which P-CSI report is transmitted in case a transmission of both P-CSI report types coincides in a same UL TTI. Therefore, after UE 114 prioritizes a P-CSI transmission according to the lower CSI process index (if multiple such processes exist) and according to a DL cell index (if multiple such DL cells exist), as it was previously described (see also REF 3), embodiments of the present disclosure consider that UE 114 is informed for a P-CSI report prioritization either by a 1-bit higher layer signaling from eNB 102, or by an implicit rule according to a P-CSI report index (0 or 1), or by a fixed rule in the operation of the communication system such as always prioritizing transmission for the P-CSI report corresponding to a DL flexible TTI (or to a DL fixed TTI), or for suspending the P-CSI report having a more recent transmission in a previous UL TTI.

The first option decouples P-CSI reporting corresponding to DL fixed TTIs and DL flexible TTIs by using TDM. However, an availability of UL fixed TTIs per frame can be low, such as one UL fixed TTI per frame for TDD UL-DL configuration 5, thereby necessitating long periodicities for each P-CSI report in order to avoid a P-CSI report corresponding to a DL fixed TTI having to be transmitted in a same UL TTI as a P-CSI report corresponding to a DL flexible TTI. Unless a channel experienced by UE 114 is practically stationary, long P-CSI reporting periodicities can be detrimental to DL system throughput.

A second option for multiplexing a P-CSI report for a measurement in a DL fixed TTI with a P-CSI report for a measurement in a DL flexible TTI is by joint coding in a same PUCCH. This can be either a default choice or indicated to UE 114 by higher layer signaling. Even though a PUCCH format may not be able to support a maximum payload for both P-CSI report types resulting from reporting both CQI and PMI, such maximum payloads can be avoided if eNB 102 obtains a PMI from a SRS transmitted from UE 114 and P-CSI reports convey only CQI which may further be restricted to be only for transmission rank 1 in order to further reduce its payload. Additionally, a first UE 114 reporting both P-CSI types can use a different transmission format than a second conventional UE 115 reporting on a first P-CSI type. For example, the first UE 114 can use a format supporting higher P-CSI payloads and referred to as PUCCH format 3, while the second UE 115 can use a format supporting lower P-CSI payloads and referred to as PUCCH format 2. Therefore, a conventional UE always transmits a single P-CSI using a PUCCH format 2 while UE 114 supporting adaptation of a TDD UL-DL configuration can be configured by eNB 102 whether to transmit both a P-CSI report for a measurement in a DL fixed TTI and a P-CSI report for a measurement in a DL flexible TTI in a same PUCCH format 2 or in a same PUCCH format 3.

Similar to P-SRS transmission, a P-CSI can be transmitted in an UL flexible TTI and UE 114 can be provided by higher layer signaling from eNB 102 a second set of parameters for P-CSI transmissions in an UL flexible TTI (in addition to the first set of parameters for P-CSI transmissions in an UL fixed TTI). Unlike conventional P-CSI and P-SRS transmissions that are not allowed to occur simultaneously as their transmissions can be arranged by eNB 102 to occur in different UL TTIs, such arrangement may not be possible for a P-CSI report for a measurement in a DL flexible TTI as an adaptation rate of an TDD UL-DL configuration may not be long enough to avoid such simultaneous transmissions especially when a number of UL TTIs per frame is small. Therefore, the invention further considers that, unlike conventional UEs, UEs supporting adaptation of a TDD UL-DL configuration can also support simultaneous P-CSI and P-SRS transmissions by puncturing P-CSI transmission in a last TTI symbol of a respective PUCCH in order to transmit P-SRS.

Aperiodic CSI Feedback for DL Fixed TTIs and for DL Flexible TTIs

In certain embodiments, A-CSI feedback for DL flexible TTIs is considered. For A-CSI reporting by UE 114 supporting adaptation of a TDD UL-DL configuration on a fast time scale, given the existence of different A-CSI report types computed by respective measurements in DL fixed TTIs and in DL flexible TTIs, UE 114 behavior needs to be further defined when it detects a PDCCH conveying a DCI format including an A-CSI request field indicating that UE 114 should include an A-CSI report with its scheduled PUSCH transmission.

In a first option, embodiments of the present disclosure consider that if a CSI request field includes 1 bit, a value of binary '0' indicates that UE 114 shall not multiplex any A-CSI report in the PUSCH transmission while a value of '1' indicates that UE 114 shall multiplex both an A-CSI report for a measurement in a DL fixed TTI and an A-CSI report for a measurement in a DL flexible TTI.

If the DCI format scheduling a PUSCH transmission from UE 114 has an A-CSI request field that includes 2 bits, this can provide additional flexibility in selecting an A-CSI report type for multiplexing in a PUSCH transmission and provide to eNB 102 means for controlling a respective A-CSI overhead as needed. TABLE 4 provides an indicative mapping of an A-CSI request field to triggering of A-CSI report types.

TABLE 4

Mapping of A-CSI Request Field Values to A-CSI Report Types.

| Value of CSI request field | Description |
| --- | --- |
| '00' | No A-CSI report is triggered |
| '01' | A-CSI report is triggered for a CSI measurement associated with DL fixed TTIs |
| '10' | A-CSI report is triggered for a CSI measurement associated with DL flexible TTIs |
| '11' | A-CSI report is triggered both for a CSI measurement associated with DL fixed TTIs and for a CSI measurement associated with DL flexible TTIs |

A support for indicating an A-CSI type can further be extended in case DL Carrier Aggregation (CA) or DL Coordinated Multi-Point (COMP) transmission is supported in conjunction with an adaptive TDD UL-DL configuration. For example, in case of also supporting DL CA, an A-CSI request field may include 3 bits with an indicative mapping as in TABLE 5.

TABLE 5

Mapping of A-CSI Request Field Values to A-CSI Report Types.

| Value of CSI request field | Description |
|---|---|
| '000' | No A-CSI report is triggered |
| '001' | A-CSI report is triggered for a CSI measurement associated with DL fixed TTIs and for serving cell c |
| '010' | A-CSI report is triggered for a CSI measurement associated with DL flexible TTIs and for serving cell c |
| '011' | A-CSI report is triggered for a CSI measurement associated with DL fixed TTIs and for a $1^{st}$ set of serving cells configured by higher layers |
| '100' | A-CSI report is triggered for a CSI measurement associated with DL flexible TTIs and for a $1^{st}$ set of serving cells configured by higher layers |
| '101' | A-CSI report is triggered for a CSI measurement associated with DL fixed TTIs and for a $2^{nd}$ set of serving cells configured by higher layers |
| '110' | A-CSI report is triggered for a CSI measurement associated with DL flexible TTIs and for a $2^{nd}$ set of serving cells configured by higher layers |
| '111' | Reserved |

A support for indicating an A-CSI type can be further extended to indicate a respective measurement report for a specific DL flexible TTI. A same correspondence to a specific DL flexible TTI can be defined for a P-CSI report. The reason for distinguishing among DL flexible TTIs is because a respective interference can be different for different DL flexible TTIs. Alternatively, UE 114 can determine how to perform the CSI measurements as described in a subsequent embodiment.

Figure 13:
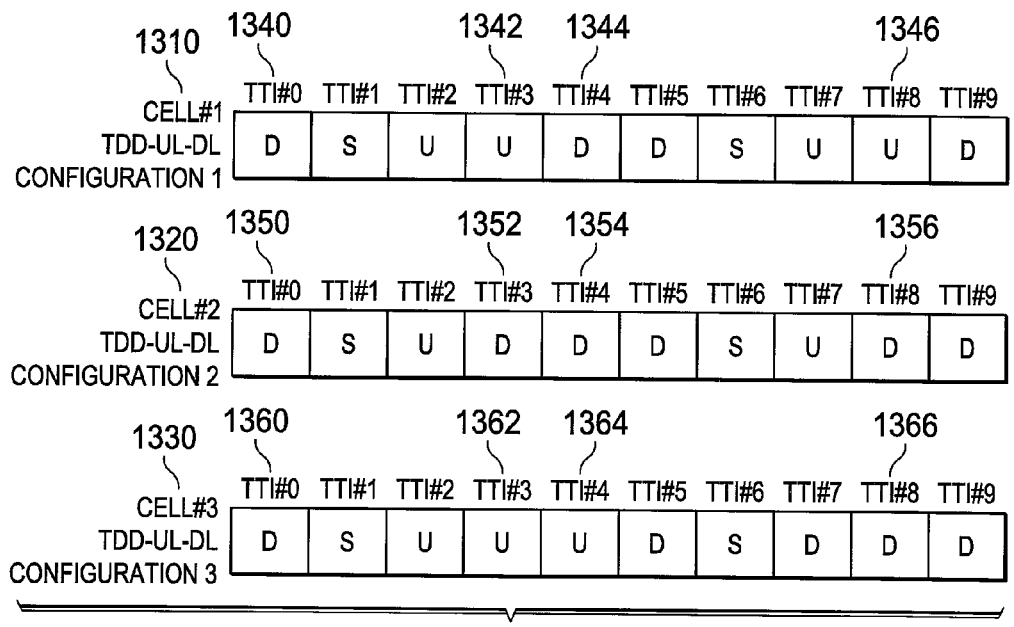
FIG. 13 illustrates an example existence of different interference characteristics in different flexible TTIs according to this disclosure.

FIG. 13 illustrates an example for an existence of different interference characteristics in different flexible TTIs according to this disclosure. The embodiment of the TTIs shown in FIG. 13 is for illustration only. Other embodiments could be used without departing from the scope of the present disclosure.

As shown in FIG. 13, TDD UL-DL configuration 1 is used in reference cell#1 1310, TDD UL-DL configuration 2 is used in interfering cell#2 1320, and TDD UL-DL configuration 3 is used in interfering cell#3 1330. In DL TTI#0 (or DL TTI#0, DL TTI#5, DL TTI#6, and DL TTI#9) in cell#1 1340, cell#2 1350, and cell#3 1360, an interference experienced by DL transmissions is statistically same. In TTI#3, an interference in cell#2 1352 is from UL transmissions both in cell#1 1342 and in cell#3 1362. Therefore, in TTI#3, PDSCH transmissions to UE 114 in cell#2 that is located towards cell#1 or cell#3 experiences interference from UL transmissions. In TTI#4, an interference in cell#2 1354 is from DL transmissions in cell#1 1344 but from UL transmissions in cell#3 1364. Therefore, in TTI#4, a PDSCH transmission to UE 114 in cell#2 that is located towards cell#1 experiences interference from DL transmissions and a PDSCH transmission to UE 114 in cell#2 that is located towards cell#3 experiences interference from UL transmissions. Finally, in TTI#8, an interference in cell#2 1356 is from UL transmissions in cell#1 1346 but from DL transmissions in cell#3 1366. Therefore, in TTI#8, a PDSCH transmission to UE 114 in cell#2 that is located towards cell#1 experiences interference from UL transmissions and a PDSCH transmission to UE 114 in cell#2 that is located towards cell#3 experiences interference from DL transmissions. In conclusion, not only there exists interference variation between the two DL TTI types (DL fixed TTIs and DL flexible TTIs) but also there exists interference variation in different DL flexible TTIs.

In one approach to address such interference dependence on an index of a DL flexible TTI, respective P-CSI and A-CSI reporting processes can be supported that are based on a measurement using CSI-IM resources only for the corresponding DL TTI. For P-CSI, respective reports can be supported based on previously described methods for supporting P-CSI for DL fixed TTIs and for a DL flexible TTI.

For A-CSI reporting, same options exist as described for A-SRS reporting when triggered by a DCI format scheduling a PDSCH. Therefore, in a first option, if an A-CSI report is triggered, all A-CSI reports for respective DL flexible TTIs can be included in a same PUSCH. In a second option, if the DL TTI of a PDCCH transmission triggering an A-CSI report is fixed or flexible, the respective DL TTI for the A-CSI report is correspondingly fixed or flexible. In a third option, the A-CSI request field can be further expanded to provide an index to specific DL TTIs for which respective A-CSI reports are to be included in a PUSCH.

In addition, for A-CSI reporting in a PUSCH transmission from UE 114 to eNB 102, an additional option (relative to the previous ones that are also in principle applicable for triggering A-SRS transmission from a UE to an eNB) can be based on a Cyclic Shift (CS) and Orthogonal Covering Code (OCC) field (CS-OCC field) that exists in a DCI format scheduling the PUSCH and triggering the A-CSI reporting (see also REF 2). The CS-OCC field informs UE 114 of a CS and an OCC to apply to the DMRS transmission in the PUSCH, in order to facilitate spatial multiplexing of PUSCH transmissions from different UEs, and of a resource for an acknowledgement signal transmission from eNB 102 in response to the PUSCH reception (see also REF 1 and REF 3). The CS-OCC field is assumed to include 3 bits. Communication systems operating with an adaptive TDD UL-DL configuration intend to adapt to fast variations of a total traffic in a cell. Statistically, the smaller a number of UEs having active communication in a cell, the larger the variations in a total traffic in the cell. Therefore, operation with an adaptive TDD UL-DL configuration is associated with a typically small number of UEs having active communication in a cell and a CS-OCC field can provide the intended functionalities with less than 3 bits, such as 2 bits. Then, the additional bit can be used to supplement a CSI request field that includes 1 bit or 2 bits and respectively provide a CSI request field that includes 2 bits or 3 bits as it was previously described. For example, the Most Significant Bit (MSB) of a CS-OCC field can supplement a CSI request field as the MSB of the CSI request field. For example, 4 CS-OCC states, of the 8 CS-OCC states addressable by a 3-bit CS-OCC field, can be remapped to a 2-bit CS-OCC field.

Using SRS for Link Adaptation of DL Transmissions

In this embodiment, eNB 102 can use a reception of a SRS transmitted from a UE to perform link adaptation for DL transmissions to UE 114. In a TDD system, a channel medium is same for DL transmissions and for UL transmissions as a same carrier frequency is used. In a conventional TDD system, where interference to DL transmissions in a cell is from DL transmissions in neighboring cells, as a same TDD UL-DL configuration is typically assumed, UE 114 needs to provide CSI feedback to eNB 102 as SRS transmissions can provide information for the channel medium but cannot provide information for interference experienced by DL transmissions to UE 114 from eNB 102 as this interference is typically significantly different that the interference experienced by UL transmissions from UE 114 to eNB 102.

For a TDD system operating with an adaptive TDD UL-DL configuration, two sets of UL TTIs exist where in a first set of UL TTIs UL interference is dominant and in a second set of UL TTIs DL interference is dominant. Moreover, two sets of DL TTIs exist where in a first set of DL TTIs DL interference is dominant and in a second set of DL TTIs UL interference is dominant.

Therefore, when the previous two sets of TTIs exist, a SRS transmission in the first set of UL TTIs can be used for DL link adaptation for the second set of DL TTIs as, especially since UE 114 typically experiences one dominant interferer, the first set of UL TTIs and the second set of DL TTIs experience the same UL interference. Similar, a SRS transmission in the second set of UL TTIs can be used for DL link adaptation for the first set of DL TTIs as, for one dominant interferer, the second set of UL TTIs and the first set of UL TTIs experience the same DL interference.

Using SRS transmissions to obtain a CSI for DL transmissions, as it was previously described, can be advantageous to a system operation over relying on CSI feedback from a UE for several reasons that include:
a) SRS transmissions are not subject to quantization errors;
b) SRS transmissions are not subject to detection (decoding) errors;
c) SRS transmissions can provide CSI over substantially an entire bandwidth while CSI feedback from UE 114 provides only average information over the entire bandwidth or information for only a few sub-bands of the entire bandwidth; and
d) SRS transmissions typically require significantly less UL overhead than CSI transmissions.

Figure 14:
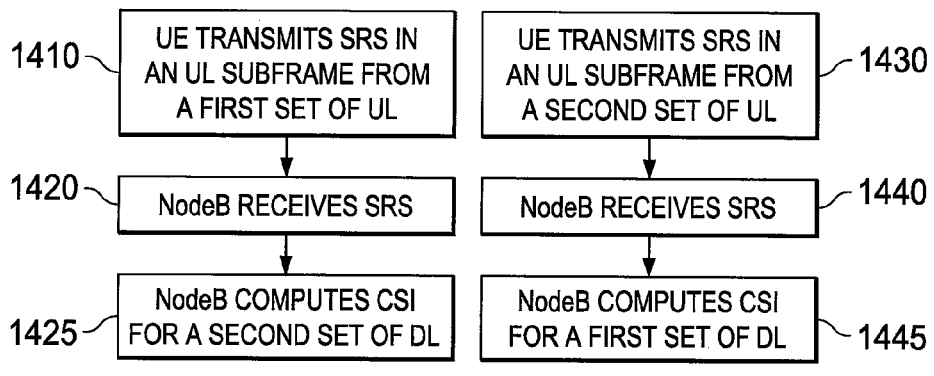
FIG. 14 illustrates an example determination by an eNB of a DL CSI in a first set of DL TTIs using a SRS transmission from a UE in a second set of UL TTIs according to this disclosure.

FIG. 14 illustrates an example determination by eNB 102 of a DL CSI in a first set of DL TTIs using a SRS transmission from UE 114 in a second set of UL TTIs according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 14, UE 114 transmits SRS in an UL TTI from a first set of UL TTIs where UL transmissions from UE 114 experience a dominant UL interference in operation 1410. In operation 1420, eNB 102 receives the SRS transmission from UE 114 and, based on the received SRS, eNB 102 computes a CSI for a second set of DL TTIs where DL transmissions to UE 114 experience a dominant UL interference in operation 1425. Alternatively, UE 114 transmits SRS in an UL TTI from a second set of UL TTIs where UL transmissions from UE 114 experience a dominant DL interference in operation 1430. In operation 1440, eNB 102 receives the SRS transmission from UE 114 and, based on the received SRS, eNB 102 computes a CSI for a first set of DL TTIs where DL transmissions to UE 114 experience a dominant DL interference in operation 1445.

Figure 15:
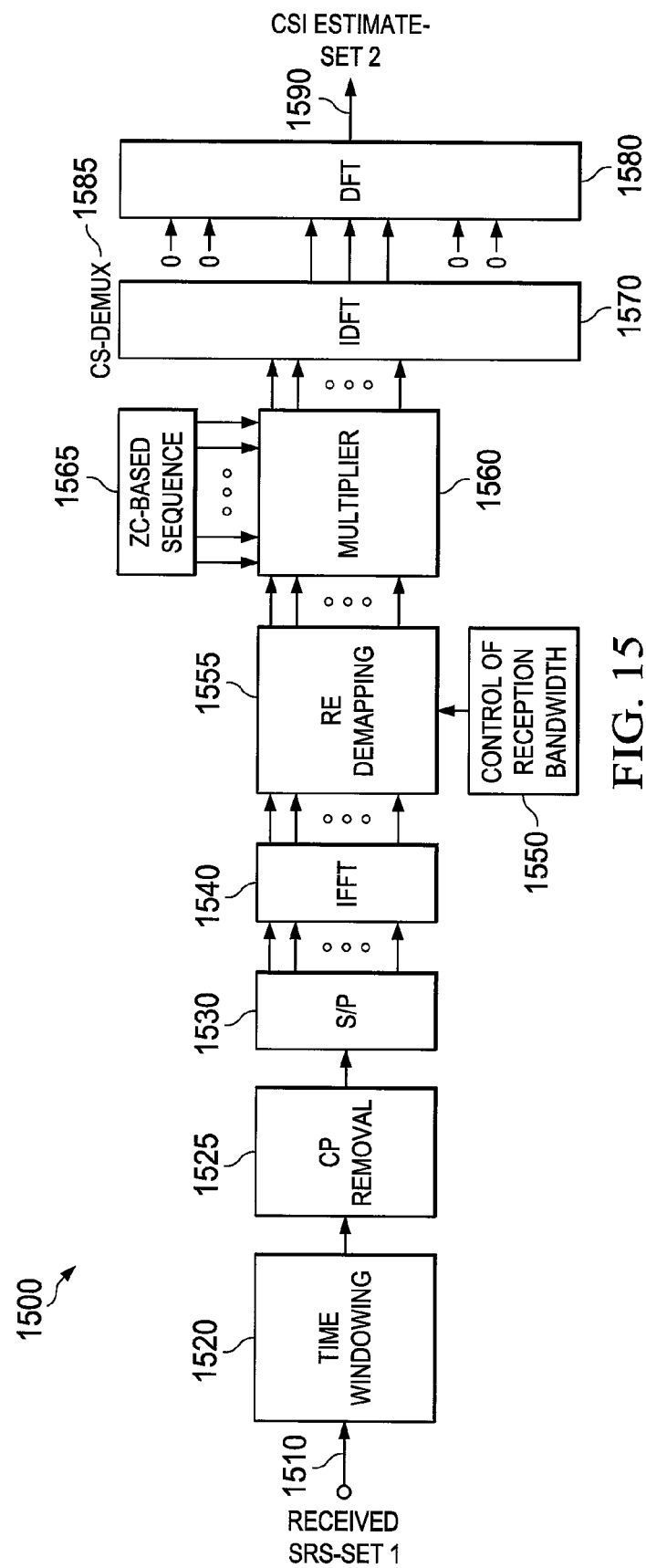
FIG. 15 illustrates an example eNB receiver for estimating a DL CSI in a TTI set based on a SRS transmission from a UE according to this disclosure.

FIG. 15 illustrates an example eNB receiver for estimating a DL CSI in a TTI set based on a SRS transmission from a UE according to this disclosure. The embodiment of the receiver 1500 shown in FIG. 15 is for illustration only. Other embodiments could be used without departing from the scope of the present disclosure. In certain embodiments, the eNB receiver 1500 shown in FIG. 15 is implemented in eNB 102.

As shown in FIG. 15, eNB 102 receives a SRS transmitted from UE 114 in an UL TTI from a first set of UL TTIs where the SRS experiences UL interference 1510. After filtering 1520 and CP removal 1525, an output is provided to a serial-to-parallel (S/P) converter 1530 and subsequently an IFFT is performed 1540 and a reception bandwidth control unit 1550 selects REs of SRS reception 1555. Element-wise multiplication 1560 with a Zadoff-Chu based sequence 1565 UE 115 used to transmit the SRS follows and an output is provided to an IDFT 1570 and, after restoring a cyclic shift applied to the SRS transmission 1585, a DFT is performed 1580 and a CSI estimate for DL signal transmissions in a DL TTI of a second set of DL TTIs where DL signal transmissions experience UL interference is obtained 1590. A same receiver structure can be used to obtain a CSI estimate for DL signal transmissions in a DL TTI of a first set of DL TTIs where DL signal transmissions experience DL interference based on a reception of a SRS transmitted from UE 114 in an UL TTI from a second set of UL TTIs where the SRS experiences DL interference.

Additionally, eNB 102 can use SRS transmissions in conjunction with CSI feedback from UE 114 in order to compute a DL CSI for a first set of DL TTIs or for a second set of DL TTIs. For example, eNB 102 can use a SRS transmission from UE 114 in a second set of UL TTIs, as it was previously described, in conjunction with a CSI feedback from UE 114 for a first set of DL TTIs to compute a CSI for the first set of DL TTIs. Similar, eNB 102 can use a SRS transmission from UE 114 in a first set of UL TTIs, as it was previously described, in conjunction with a CSI feedback from UE 114 for a second set of DL TTIs to compute a CSI for the second set of DL TTIs.

UE CSI Measurements

In certain embodiments, a measurement procedure is described for UE 114 to report CSI for a first set of DL TTIs, such as a set including DL TTIs where DL transmissions from eNB 102 to UE 114 experiences dominant DL interference, and for a second set of DL TTIs, such as a set including DL TTIs where UE 114 experiences dominant UL interference.

CSI measurements from UE 114 in a first DL TTI set and in a second DL TTI set can be based either on a CRS or on a CSI-RS, for example depending of a transmission mode UE 114 is configured for PDSCH receptions. A CSI measurement can be derived from a measurement of another quantity, such as a SINR, and can also consider UE 114 receiver capability.

As a first set of DL TTIs and a second set of DL TTIs are configured to UE 114 by higher layer signaling, such as RRC signaling, and as the interference type (DL or UL) can vary on a faster time scale due to a respective adaptation of a TDD UL-DL configuration, the first DL TTI set or the second DL TTI set can include DL TTIs where UE 114 experiences either DL dominant interference or UL dominant interference. For example, the first DL TTI set can include only TTIs that are DL subframes in an adapted TDD UL-DL configuration and are UL TTIs in a conventional TDD UL-DL configuration and the second DL TTI set can include TTIs that are DL TTIs (or special TTIs) in both an adapted TDD UL-DL configuration and a conventional TDD UL-DL configuration. In this example, a DL signal transmission in a DL TTI from the first set of DL TTIs can experience either UL-dominant or DL-dominant interference while a DL signal transmission in a DL TTI from the second set of DL TTIs can typically experience only DL-dominant interference when interfering cells are assumed to use a same conventional configuration but can use different respective adapted TDD UL-DL configurations.

In general, for proper DL scheduling, it is desirable for UE 114 to avoid measuring a same CSI over DL TTIs that experience both DL-dominant interference and UL-dominant interference. Instead, it is desirable for UE 114 to provide a first CSI that captures only DL-dominant interference and a second CSI that captures only UL-dominant interference to DL signaling transmissions from eNB 102, particularly if eNB 102 knows the DL TTIs where UE 114 experiences each dominant interference type (DL or UL).

For example, referring to FIG. 13, UE 114 located in Cell#2 (that uses TDD UL-DL configuration 2) and experiences interference from Cell#3 (that uses TDD UL-DL configuration 3), can have as TTI#3, TTI#4, and TTI#8 configured by eNB 102 to be in a same set of TTIs for CSI reporting by UE 114. A DL transmission to UE 114 in TTI#3 or TTI#4 experiences UL-dominant interference while a DL transmission to UE 114 in TTI#8 experiences DL-dominant interference. As a consequence, a SINR measurement (based on a CRS or on a CSI-RS) by UE 114 in TTI#3 or TTI#4 is likely to be larger than a SINR measurement by UE 114 in TTI#8 as UL interference is typically smaller than DL interference. Therefore, if eNB 102 knows the type of dominant interference (DL or UL) UE 114 experiences in a TTI, it is beneficial for UE 114 to only include measurements in TTI#3 or TTI#4 (and not include measurements in TTI#8) in deriving a CSI for a respective set of TTIs. Otherwise, if for example UE 114 derives a CSI based on filtered measurements, such as an average of measurements, in TTI#3, TTI#4, and TTI#8, the CSI is likely to be pessimistic for TTI#3 and TTI#4. Then, although eNB 102 can be aware of this pessimistic CSI report for TTI#3 and TTI#4, it cannot determine a proper CSI for link adaptation of a DL transmission to UE 114 in TTI#3 or TTI#4. Conversely, if TTI#0, TTI#1, TTI#5, TTI#6, and TTI#9 are in a same set of TTIs, a SINR measurement can be expected to be similar as UE 114 experiences DL-dominant interference in all these TTIs and UE 114 can derive a CSI based on filtered measurements in all TTIs in the set of TTIs or based on filtered measurements in any TTIs in the set of TTIs.

For UE 114 to separate a determination of CSI corresponding to TTIs with DL-dominant interference from a determination of CSI corresponding to TTIs with UL-dominant interference, embodiments of the present disclosure consider that UE 114 uses a threshold for determining whether or not to include a measurement it obtains in a DL TTI in a filtered average of measurements it computes for deriving a first CSI or a second CSI. For example, for deriving a first CSI that captures DL-dominant interference, UE 114 can include in a filtered average only measurements that are below a first threshold while for computing a second CSI that captures UL-dominant interference, UE 114 can include in a filtered average only measurements that are at or above a second threshold. For example, the first threshold and the second threshold can be same. For example, the first threshold and the second threshold can be computed by UE 114 as an average of a first number of smallest measurement values and a first number of largest measurement values over respective DL TTIs.

Figure 16:
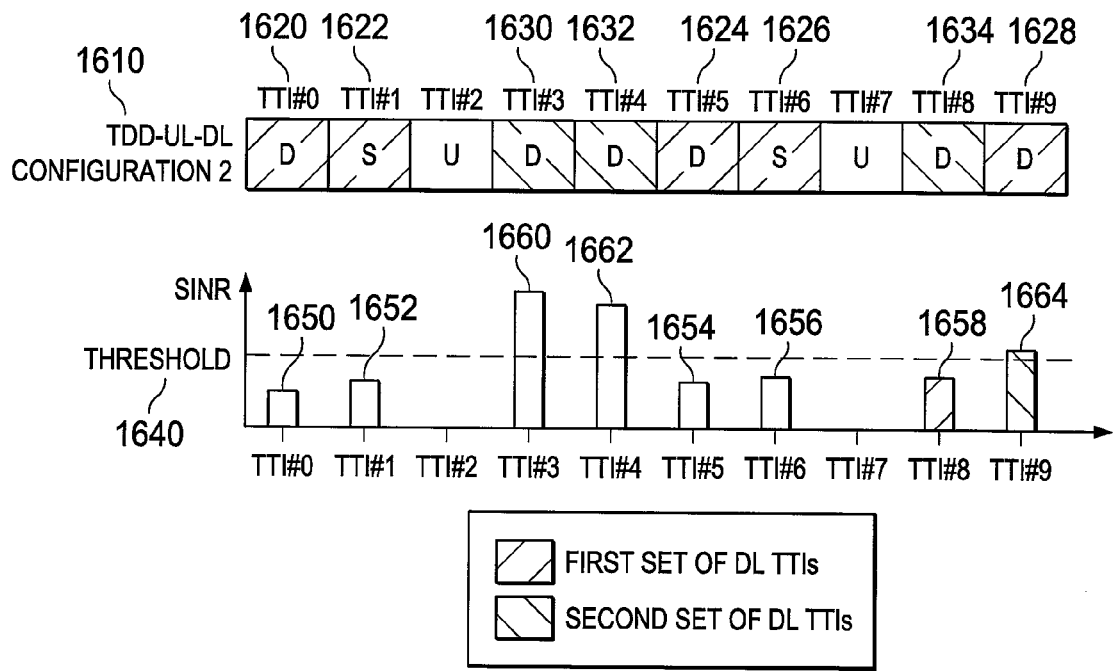
FIG. 16 illustrates an example for a UE to determine a first CSI from a first set of DL TTIs or to determine a second CSI from a second set of DL TTIs according to this disclosure.

FIG. 16 illustrates an example for a UE to determine a first CSI from a first set of DL TTIs or to determine a second CSI from a second set of DL TTIs according to this disclosure. The embodiment of the TTIs shown in FIG. 16 is for illustration only. Other embodiments could be used without departing from the scope of the present disclosure.

As shown in FIG. 16, UE 114 operates with TDD UL-DL configuration 2 1610. UE 114 is configured a first set of TTIs (subframes), that includes TTI#0 1620, TTI#1 1622, TTI#5 1624, TTI#6 1626, and TTI#9 1628, for measurements corresponding to a first CSI. UE 114 is also configured a second set of TTIs, that includes TTI#3 1630, TTI#4 1632, TTI#8 1634, for measurements corresponding to a second CSI. TTI#7 can also be included in one of the sets, such as the second set, but for TDD UL-DL configuration 2 it is an UL TTI and therefore cannot be used for CSI measurements. The measurements can be, for example, SINR ones based on CRS (in DL TTIs that include CRS). UE 114 compares a measurement in a respective DL TTI in the first set of TTIs to a threshold 1640. If the measurement is above the threshold, the DL TTI is not considered for the computation of the first CSI; otherwise, the DL TTI can be considered for the computation of the first CSI. UE 114 also compares a measurement in a respective DL TTI in the second set of TTIs to the threshold 1640. If the measurement is below the threshold, the DL TTI is not considered for the computation of the second CSI; otherwise, the DL TTI can be considered for the computation of the second CSI. Therefore, based on the measurements in TTI#0 1650, TTI#1 1652, TTI#5 1654, TTI#6 1656, and TTI#9 1658, UE 114 can consider these first four TTIs for a computation of the first CSI the TTI but does not consider TTI#9. Based on the measurements in TTI#3 1660, TTI#4 1662, and TTI#8 1664, UE 114 can consider these first two TTIs for a computation of the second CSI the TTI but does not consider TTI#8. In one option, TTI#9 and TTI#8 can be discarded for any CSI computation. In another option, TTI#9 can be considered for the second CSI computation while TTI#8 can be considered for the first CSI computation despite being associated with the first DL TTI set and the second DL TTI set, respectively.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a user equipment (UE) to transmit a channel state information (CSI) report, the method comprising:
   receiving information for first and second sets of time resources over a time period, wherein at least one time resource from the second set of time resources is associated with a first transmission direction in a first time period and with a second transmission direction in a second time period;
   receiving respective first and second channel state information-interference measurement (CSI-IM) resource configurations for a same CSI-process for the first and second sets of time resources;
   performing first and second interference measurements based on respective first and second CSI-IM resource configurations; and
   transmitting a CSI report based on the first or second interference measurement.

2. The method of claim 1, wherein the CSI process includes a single non-zero power reference signal (CSI-RS) configuration.

3. The method of claim 1, wherein the transmitting comprises:

when the UE is configured for simultaneous transmission of both a CSI report for the first set of time resources and a CSI report for the second set of time resources for a same serving cell, prioritizing transmission of only a CSI report for one of the first set of time resources or the second set of time resources that is associated with a smaller index.

4. The method of claim 1, further comprising:
receiving a downlink control information (DCI) including a CSI request field,
wherein the CSI request field has two bits that trigger at least one of a CSI report for the first set of time resources and a CSI report for the second set of time resources.

5. The method of claim 1, further comprising:
receiving a downlink control information (DCI) indicating a transmission direction for a time resource in the second set of time resources; and
performing an interference measurement in the time resource in the second set of time resources only when the DCI indicates a downlink direction for the time resource in the second set of time resources.

6. A user equipment (UE), comprising:
a transceiver; and
a processor coupled to the transceiver, wherein the processor is configured to:
receive information for first and second sets of time resources over a time period, wherein at least one time resource from the second set of time resources is associated with a first transmission direction in a first time period and with a second transmission direction in a second time period;
receive respective first and second channel state information-interference measurement (CSI-IM) resource configurations for a same CSI-process for the first and second sets of time resources;
perform a first interference measurement based on the first CSI-IM resource configuration and a second interference measurement based on the second CSI-IM resource configuration; and
transmit a CSI report based on the first interference measurement or on the second interference measurement.

7. The UE of claim 6, wherein the CSI process includes a single non-zero power reference signal (CSI-RS) configuration.

8. The UE of claim 6, wherein the processor is configured to transmit the CSI by:
when the UE is configured for simultaneous transmission of both a CSI report for the first set of time resources and a CSI report for the second set of time resources for a same serving cell, prioritizing transmission of only a CSI report for one of the first set of time resources or the second set of time resources that is associated with a smaller index.

9. The UE of claim 6, wherein the processor is further configured to:
receive a downlink control information (DCI) including a CSI request field,
wherein the CSI request field has two bits that trigger at least one of a CSI report for the first set of time resources and a CSI report for the second set of time resources.

10. The UE of claim 6, wherein the processor is further configured to:
receive a downlink control information (DCI) indicating a transmission direction for a time resource in the second set of time resources; and
perform an interference measurement in the time resource in the second set of time resources only when the DCI indicates a downlink direction for the time resource in the second set of time resources.

11. A method for a base station to receive a channel state information (CSI) report, the method comprising:
transmitting information for first and second sets of time resources over a time period, wherein at least one time resource from the second set of time resources is associated with a first transmission direction in a first time period and with a second transmission direction in a second time period;
transmitting respective first and second channel state information-interference measurement (CSI-IM) resource configurations for a same CSI-process for the first and second sets of time resources; and
receiving a CSI report based on an interference measurement using the first CSI-IM resource configuration or on a second interference measurement using the second CSI-IM resource configuration.

12. The method of claim 11, wherein the CSI process includes a single non-zero power reference signal (CSI-RS) configuration.

13. The method of claim 11, wherein the receiving comprises:
when the base station is configured for simultaneously receiving both a CSI report for the first set of time resources and a CSI report for the second set of time resources for a same serving cell, receiving a CSI report only for one of the first or second sets of time resources that is associated with a smaller index.

14. The method of claim 11, further comprising:
transmitting a downlink control information (DCI) including a CSI request field,
wherein the CSI request field has two bits that trigger at least one of a CSI report for the first set of time resources and a CSI report for the second set of time resources.

15. The method of claim 11, further comprising transmitting a downlink control information (DCI) indicating a transmission direction for a time resource in the second set of time resources.

16. A base station, comprising:
a transceiver; and
a processor coupled to the transceiver, wherein the processor is configured to:
transmit information for first and second sets of time resources over a time period, wherein at least one time resource from the second set of time resources is associated with a first transmission direction in a first time period and with a second transmission direction in a second time period;
transmit respective first and second channel state information-interference measurement (CSI-IM) resource configurations for a same CSI-process for the first and second sets of time resources; and
receive a CSI report based on a first interference measurement using the first CSI-IM resource configuration or on a second interference measurement using the second CSI-IM resource configuration.

17. The base station of claim 16, wherein the CSI process includes a single non-zero power reference signal (CSI-RS) configuration.

18. The base station of claim 16, wherein the processor is configured to receive the CSI by:
   when the base station is configured for simultaneously receiving both a CSI report for the first set of time resources and a CSI report for the second set of time resource for a same serving cell, receiving a CSI report only for one of the first or second set of time resources that is associated with a smaller index.

19. The base station of claim 16, wherein the processor is further configured to:
   transmit a downlink control information (DCI) including a CSI request field,
   wherein the CSI request field has two bits that trigger at least one of a CSI report for the first set of time resources and a CSI report for the second set of time resources.

20. The base station of claim 16, wherein the processor is further configured to transmit a downlink control information (DCI) indicating a transmission direction for a time resource in the second set of time resources.

* * * * *